(12) United States Patent
Klaenhammer et al.

(10) Patent No.: US 11,072,301 B2
(45) Date of Patent: Jul. 27, 2021

(54) ASYMMETRIC AIRBAG ASSEMBLY FOR STEERING WHEEL ASSEMBLY

(71) Applicant: Key Safety Systems, Inc., Sterling Heights, MI (US)

(72) Inventors: Nikolaj Klaenhammer, Rodermark (DE); Kerstin Kahl, Schlangenbad (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 165 days.

(21) Appl. No.: 16/207,299

(22) Filed: Dec. 3, 2018

(65) Prior Publication Data
US 2020/0172037 A1    Jun. 4, 2020

(51) Int. Cl.
| | | |
|---|---|---|
| *B60R 21/203* | (2006.01) | |
| *B60R 21/2165* | (2011.01) | |
| *B60R 11/02* | (2006.01) | |
| *B60K 35/00* | (2006.01) | |
| *B62D 1/10* | (2006.01) | |

(52) U.S. Cl.
CPC ............ *B60R 21/203* (2013.01); *B60K 35/00* (2013.01); *B60R 11/0229* (2013.01); *B60R 11/0235* (2013.01); *B60R 11/0258* (2013.01); *B60R 11/0264* (2013.01); *B60R 21/2032* (2013.01); *B60R 21/2035* (2013.01); *B60R 21/21656* (2013.01); *B62D 1/105* (2013.01); *B60K 2370/1438* (2019.05); *B60K 2370/782* (2019.05)

(58) Field of Classification Search
CPC ............ B60R 21/203; B60R 21/21656; B60R 21/2165; B60R 21/2035; B60R 21/2037; B60R 21/2032; B60R 11/0229; B60R 11/02; B60R 11/0235; B60R 11/0258; B60R 11/0264; B60R 2011/001; B60K 35/00; B60K 2370/782; B60K 2370/1438; B62D 1/105
USPC .............................................. 280/731, 728.3
See application file for complete search history.

(56) References Cited

U.S. PATENT DOCUMENTS

| | | | | |
|---|---|---|---|---|
| 6,394,489 | B1 * | 5/2002 | Faigle | ................. B60R 21/2035 280/731 |
| 2012/0268665 | A1 * | 10/2012 | Yetukuri | ................ B60K 35/00 348/837 |
| 2019/0071112 | A1 * | 3/2019 | Toddenroth | ......... B60R 21/2035 |

* cited by examiner

*Primary Examiner* — Keith J Frisby
(74) *Attorney, Agent, or Firm* — Meunier Carlin & Curfman LLC

(57) ABSTRACT

An airbag module assembly for mounting to a steering wheel assembly has an airbag, a housing and a visual display unit. The housing has a chamber for stowing the airbag. The housing has an attachment for rigidly fixing to a steering wheel and a forward-facing opening of the chamber for receiving the airbag. The cover encloses the housing and stowed airbag. The housing is fixed to the steering wheel offset and positioned removed from a center region of the steering wheel spaced from a rim of the steering wheel. The airbag module is configured upon deployment to have the inflated airbag project outward over the rim toward an occupant.

19 Claims, 27 Drawing Sheets

0.2 ms 14.6 ms 34.0 ms

ASYMMETRIC AIRBAG ASSEMBLY FOR STEERING WHEEL ASSEMBLY

FIELD OF THE INVENTION

The present invention relates to an airbag module for an automobile generally, more specifically an asymmetric airbag assembly for a steering wheel assembly.

BACKGROUND OF THE INVENTION

Historically, most vehicle accessory controls and radio volume and tuning knobs or buttons were located on the dash. More recently, vehicles have adopted the steering wheel as a preferred place to position switches and controls such as speed or cruise control, radio controls and display menu switches. In this configuration, all the instrument gauges are still shown in the display area of the instrument panel.

In new vehicle designs, the use of a center or central mounted driver side airbag module affixed to a hub of a steering wheel has been found a very desirable safety feature. As this space in the center of the steering wheel is needed for the deployment of an airbag, the use of the space has been avoided for controls. One exception being horn activation by pushing the airbag module into horn switches to sound a horn.

These driver side airbags often have covers that tear along a seam line to allow the airbag to inflate and to deploy between a rim of the steering wheel and the driver. This space between the driver and the vehicle needs to be unobstructed for proper airbag deployment.

The present invention provides a unique way to use this space above a driver side airbag module.

SUMMARY OF THE INVENTION

An airbag module assembly for mounting to a steering wheel assembly has an airbag, a housing and a visual display unit. The housing has a chamber for stowing the airbag. The housing has an attachment for rigidly fixing to a steering wheel and a forward-facing opening of the chamber for receiving the airbag. The cover encloses the housing and stowed airbag. The housing is fixed to the steering wheel offset and positioned removed from a center region of the steering wheel spaced from a rim of the steering wheel. The airbag module is configured upon deployment to have the inflated airbag project outward over the rim toward an occupant.

In one embodiment, the airbag module is positioned below the center region, wherein the airbag module is placed on the steering wheel at a 6 o'clock location when the steering wheel is oriented at a 12 o'clock top center position. Alternatively, the airbag module can be positioned on the steering wheel at a 12 o'clock location when the steering wheel is oriented at a 12 o'clock top center position or the 3 o'clock location or the 9 o'clock location, also any combination of locations can be used if more than one airbag module assembly is used.

The cover has a first portion configured to enclose the housing and a second portion to cover the center region of the steering wheel. The cover has a frangible seam on the first portion that tears upon airbag deployment. The second portion has a flat region. A visual display unit can be positioned in the center region of the steering wheel. The visual display unit is attached to a cover affixed to the airbag module.

In one embodiment, the cover has a frangible opening that tears on deployment and the visual display unit is stationary and affixed to a fixed portion of the cover or housing removed from the frangible opening. The frangible opening of the cover is positioned along an upper portion or lower portion of the airbag module defined as centered at 12:00 o'clock or 6:00 o'clock position where 12:00 o'clock is an upper position and 6:00 o'clock is a lower position relative to the steering wheel assembly. The visual display unit can have a touch screen for controlling the visual display unit. The visual display unit can have a rigid display or a flexible touch screen display directly affixed to the airbag module. The visual display unit is positioned relative to the rim above, at or below a plane defined by the perimeter of the rotatable rim.

The rim is spaced a distance from the airbag module and visual display unit to facilitate hand grip along 360 degrees of the perimeter of the rim. The visual display unit is part of an autonomous vehicle drive system wherein the visual display unit broadcasts incoming calls, text messages and video including satellite navigation systems. The airbag module can be configured to be attached to a non-rotatable center hub of a steering wheel having a rotatable rim.

BRIEF DESCRIPTION OF THE DRAWINGS

The invention will be described by way of example and with reference to the accompanying drawings in which.

DETAILED DESCRIPTION OF THE INVENTION

Figure 1:
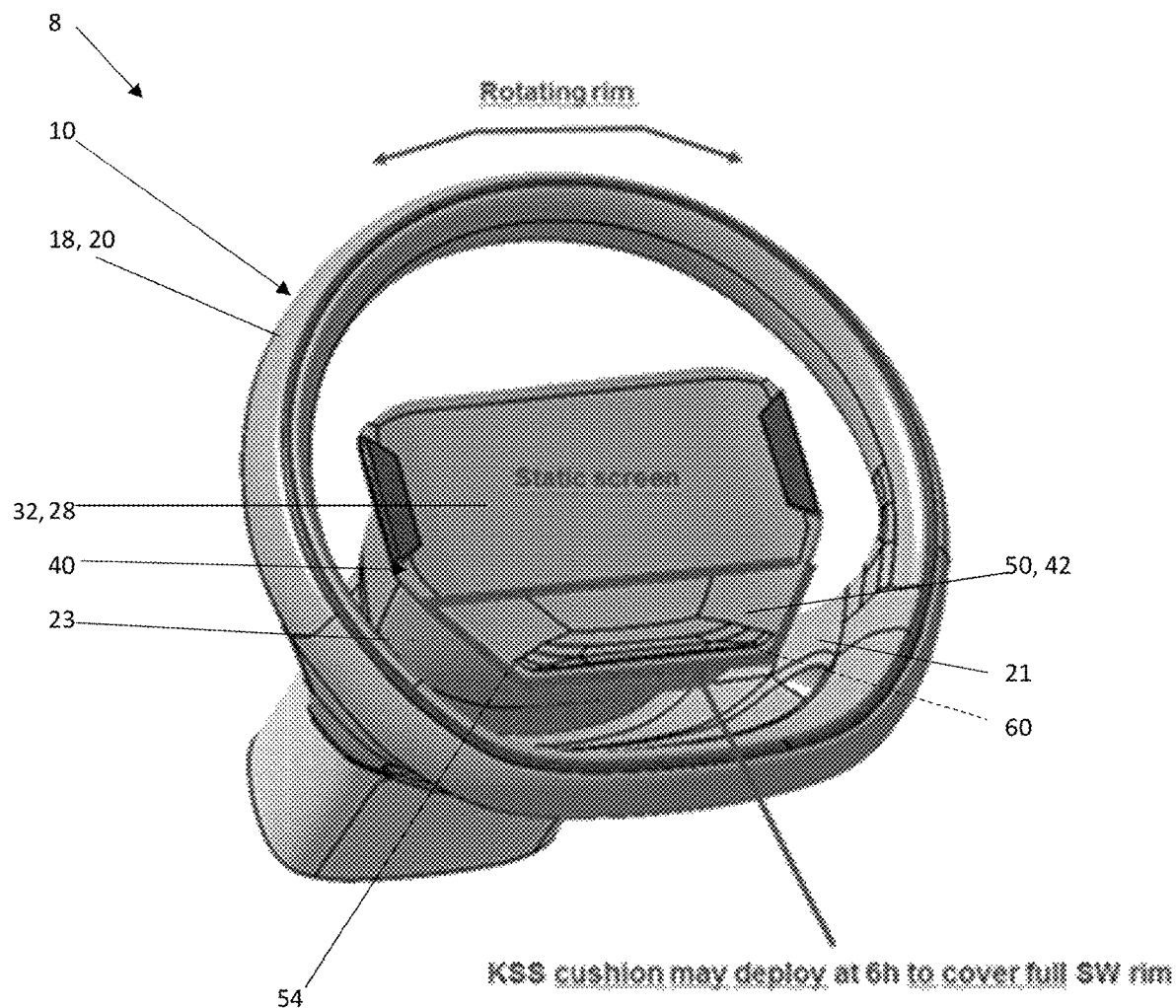
FIG. 1 is a perspective view of a steering wheel assembly with a visual display shown mounted above an airbag module.
Figure 1A:
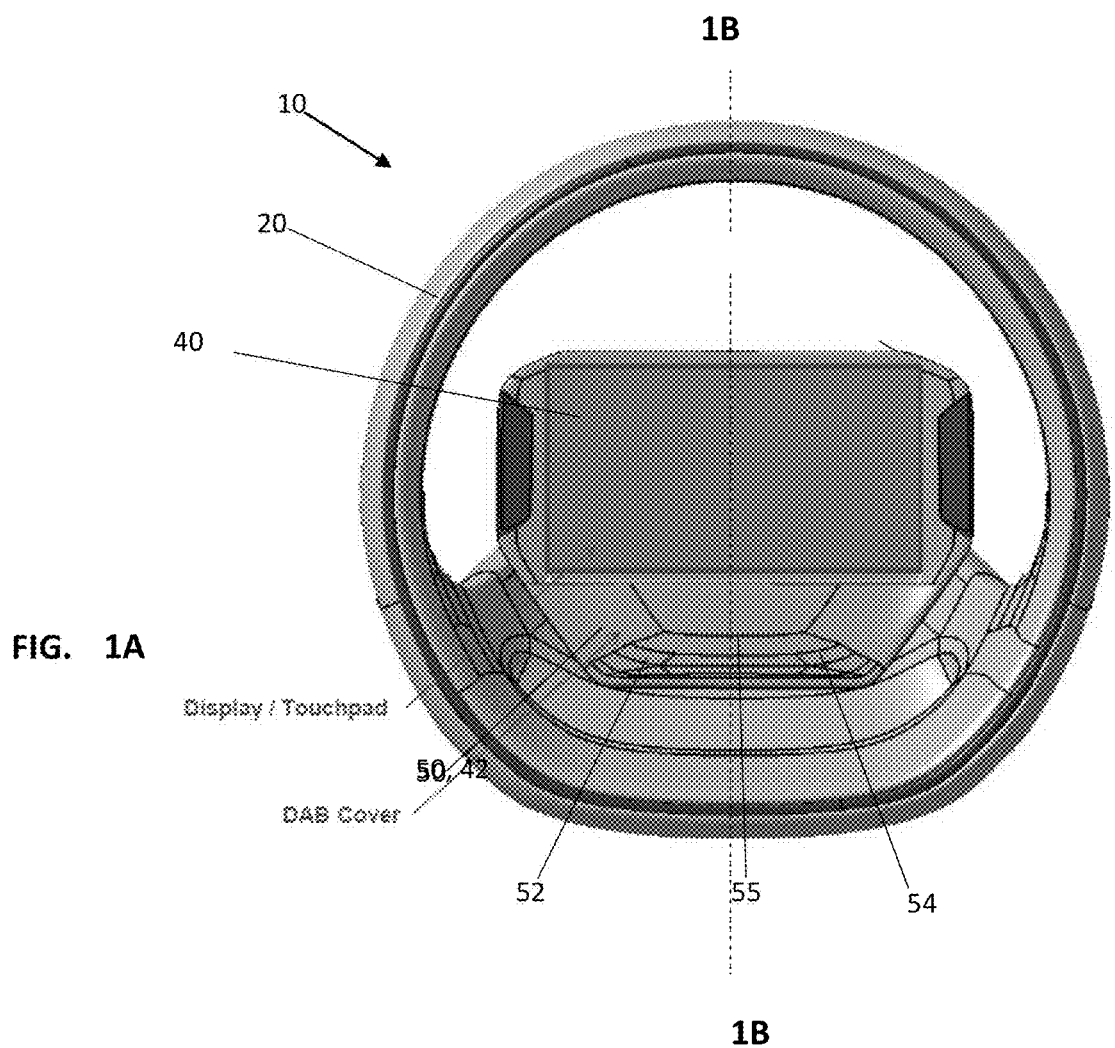
FIG. 1A is a plan view of the assembly shown in FIG. 1.

FIGS. 1 and 1A, show a steering and display assembly 8 which includes a steering wheel assembly 10 and an airbag module assembly 40 operatively mounted relative a steering wheel assembly 10. The steering wheel assembly is operatively linked to the steering column or to an electric-assist power steering unit which turns the steering column or wheels directly. In a conventional system configuration the air bag assembly is fixed to and moves with the steering wheel assembly. The steering wheel assembly and airbag assembly can be rotated, and can be moved in a telescoping fashion relative to the instrument panel of the vehicle. In other types of systems the prior art shows the airbag module assumes a fixed orientation and the steering wheel assembly rotates about the fixed airbag module assembly. The present invention is useable with both systems. FIGS. 1 and 1A show the steering wheel assembly 10 includes a steering wheel 18, a rim 20 and one or more spokes 21. The spokes extend from a centrally located hub 23 which is directly or indirectly connected to the steering system to the rim. The airbag module assembly 40 as mentioned above is secured to the steering wheel assembly or fixed in space in a known manner permitting the steering wheel assembly to move about the airbag module assembly. The major parts of the airbag module assembly 40 include a cover 50, a housing 42, an airbag 60 and a visual display unit 28.

As mentioned the major parts of the airbag module assembly 40 include a cover 50, a housing 42 hidden under the cover 50, an airbag 60 and a visual display unit 28. The cover 50 is shown in FIGS. 1 and 1A and has a larger first portion 52 and a relatively smaller second portion movably situated relative to the first portion. The first portion 52 is centrally positioned relative to the rim 20 which typically has a generally circular or slightly oval shape. In contrast to the prior art this larger centrally positioned first portion 52 of the cover does not cover the driver airbag which is typically mounted in the center of the rim. The larger portion 52 is fixedly mounted and the display unit 28 is secured to the larger first portion 52 of the cover 50, this relationship is also shown in FIG. 1A. The second cover portion 54 protects the airbag prior to deployment and is moved to an open position as the airbag inflates. The first and second portions of the cover in this embodiment are separated by a frangible seam 55 which tears upon deployment of the airbag permitting the second portion 54 to move. As can be appreciated once the tear seam rips open the second cover portion 54 essentially rotates about the lower edge 54a of the cover portion 54. This lower edge is secured to an adjacent housing. This second cover portion 54 is asymmetrically positioned relative to the center of the rim 20 as well as to the first cover portion 52 and is located relatively closer to the bottom or 6 o'clock location on the steering wheel. As can be seen essence from the above figures the visual display unit 28 occupies the center region of the steering wheel.

Figure 1B:
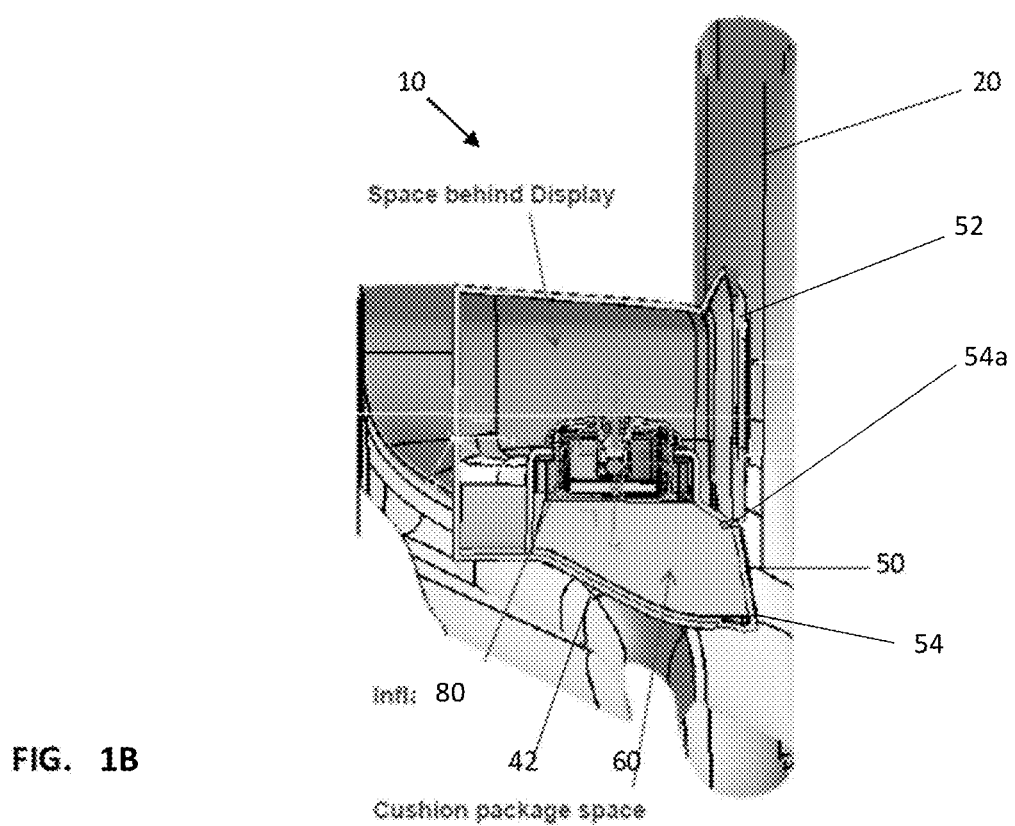
FIG. 1B is a cross-sectional view through section lines 1B-1B of FIG. 1A.

The housing is shown in greater detail in FIG. 1B. The housing includes cover support housing portion having a generally flat top surface to receive and hold the display 28, a side formed as a conical cylinder tapering to a wider diameter away from the top surface and a bottom secured to a stationary support.

FIG. 1B shows a cross-sectional view of the airbag module assembly 40 affixed offset from a center region of the steering wheel 10 with a gas generating inflator 80 attached to provide inflation gases during deployment of the airbag cushion 60.

Alternatively, the airbag module 40 and visual display unit 28 can be used on a standard steering wheel assembly 10 with a rotatable center or hub region 22, as illustrated in FIGS. 2C-3C.

Figure 1C:
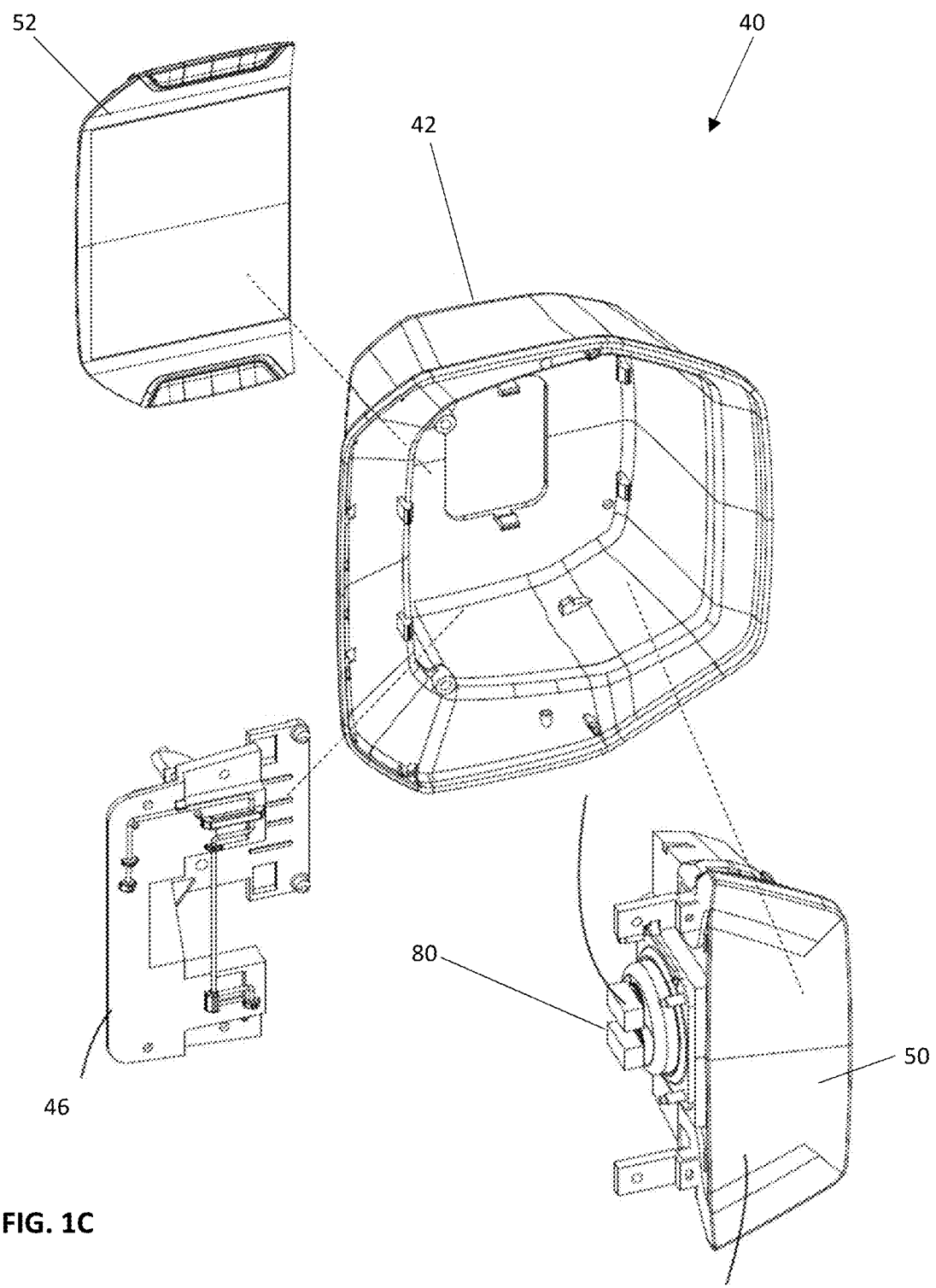
FIG. 1C is an exploded view of the airbag module housing of the present invention.

FIG. 1C is an exploded view of the airbag module housing assembly 40 showing the first cover portion 52, housing 42, cover 50 and bracket 46.

A frangible seam 55 of the cover 50 is positioned along an upper portion or lower portion of the airbag module 40 defined as centered at 12:00 o'clock or 6:00 o'clock position where 12:00 o'clock is an upper position and 6:00 o'clock is a lower position relative to the steering wheel assembly 10. The visual display unit 28 can have a touch screen 32 for controlling the visual display unit 28. The visual display unit 28 can have a rigid display 32 or a flexible touch screen 32 display directly affixed to the cover 50 of the airbag module 40. The visual display unit 28 is positioned relative to the rim 20 above, at or below a plane defined by the perimeter of the rotatable rim 20.

The rim 20 is spaced a distance from the airbag module 40 and visual display unit 28 to facilitate hand grip along 360 degrees of the perimeter of the rim 20. The visual display unit 28 can be part of an autonomous vehicle drive system wherein the visual display unit 28 broadcasts incoming calls, text messages and video including satellite navigation systems. The airbag module 40 can be configured to be attached to a non-rotatable center hub of a steering wheel assembly 10 having a rotatable rim 20.

Figure 2A:
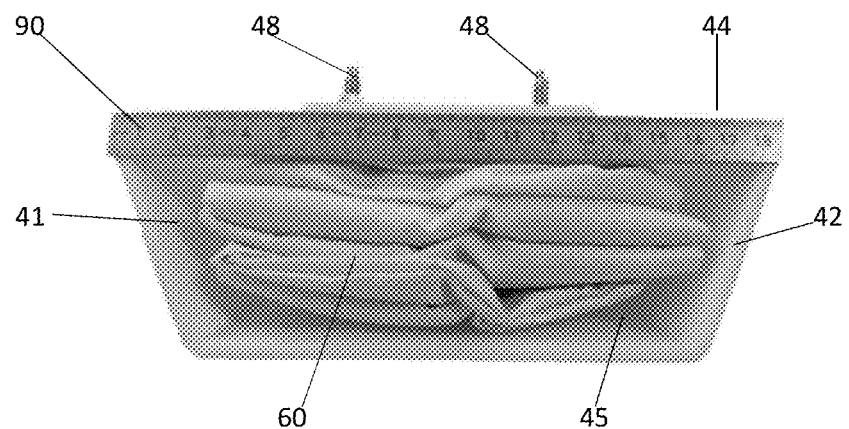
FIG. 2A is a front view of the airbag module of the present invention.
Figure 2B:
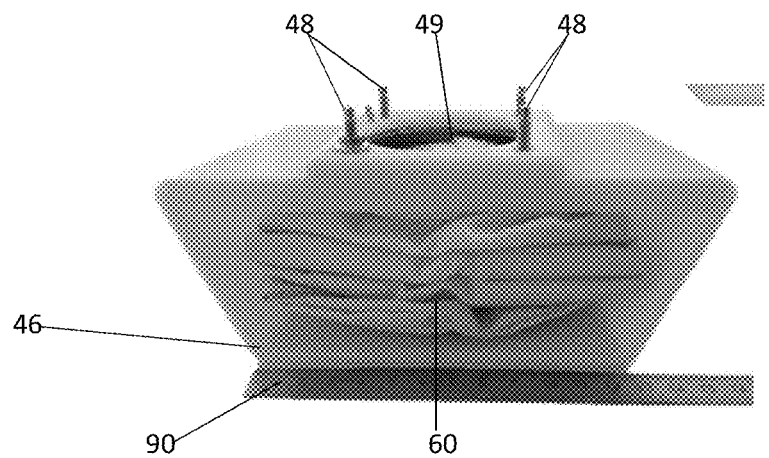
FIG. 2B is a front perspective view of the airbag module of the present invention.

As shown in FIGS. 2A and 2B, the airbag module assembly 40 without the cover 50 or visual display screen 28 is illustrated. The shape of the housing 42 is trapezoidal having the attachment side or base 44 the larger side. A frontal opening 41 is at the entrance of the chamber 45 for receiving and stowing the airbag cushion 60. As shown, the airbag cushion 60 is folded and compactly fits in the chamber 45.

In FIG. 2B, the shorter lower side 46 is shown adjacent a scale 90. In this perspective view, four attachment fasteners 48 are shown. These threaded fasteners 48 can be bolted onto the steering wheel assembly 10. A center inflator opening 49 is provided through which inflation gases can enter to inflate the airbag cushion 60 upon deployment.

Figure 2C:
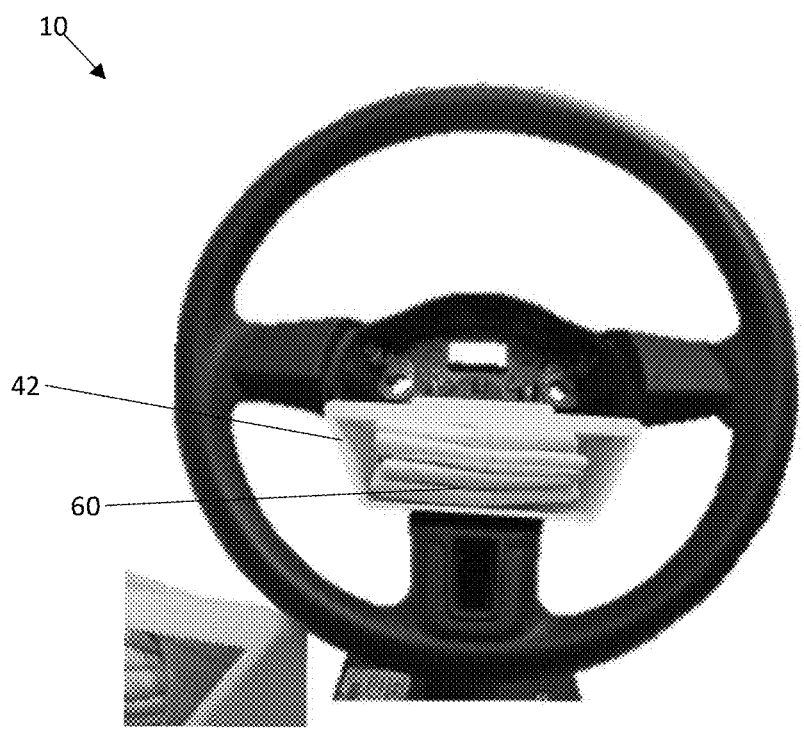
FIG. 2C is a front view of the airbag module of the present invention mounted on a steering wheel.
Figure 3A:
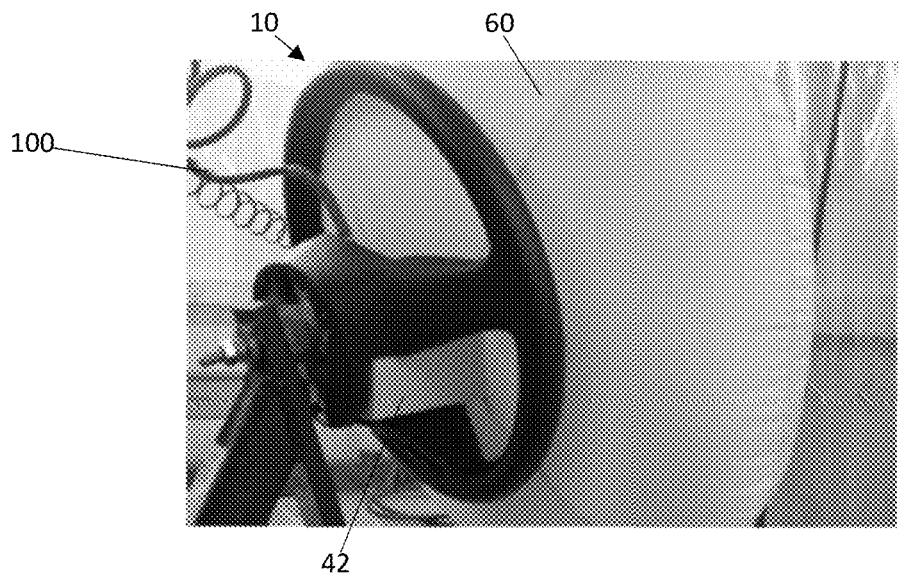
FIG. 3A is a rear side perspective view of the steering wheel and airbag module with the airbag deployed.
Figure 3B:
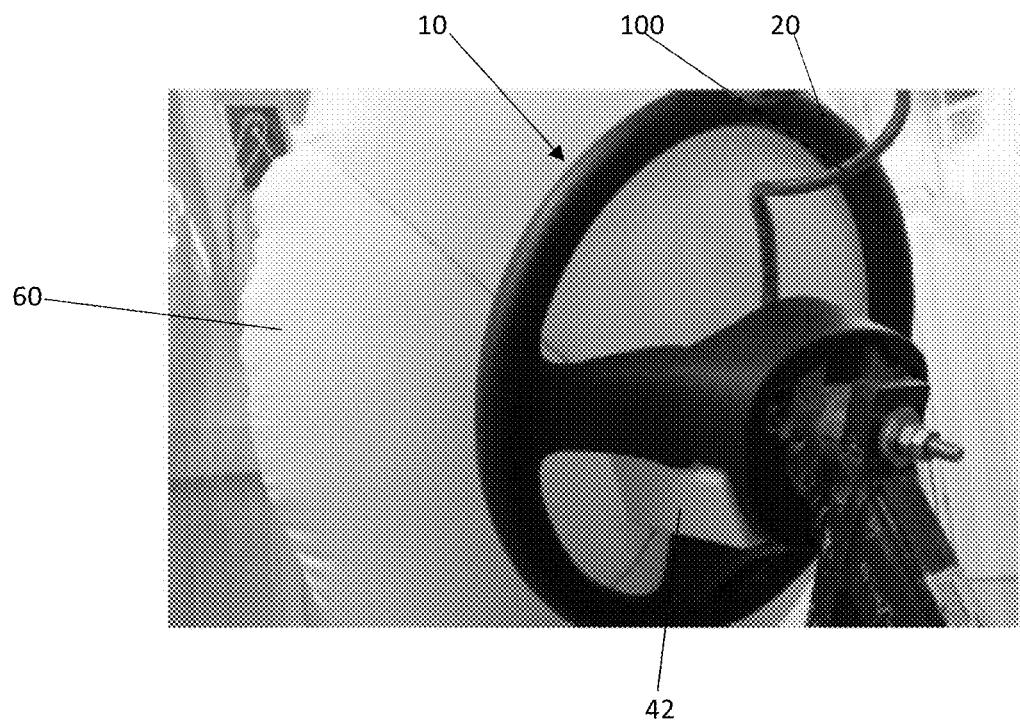
FIG. 3B is an opposite rear side perspective view of the steering wheel and airbag module with the airbag deployed.
Figure 3C:
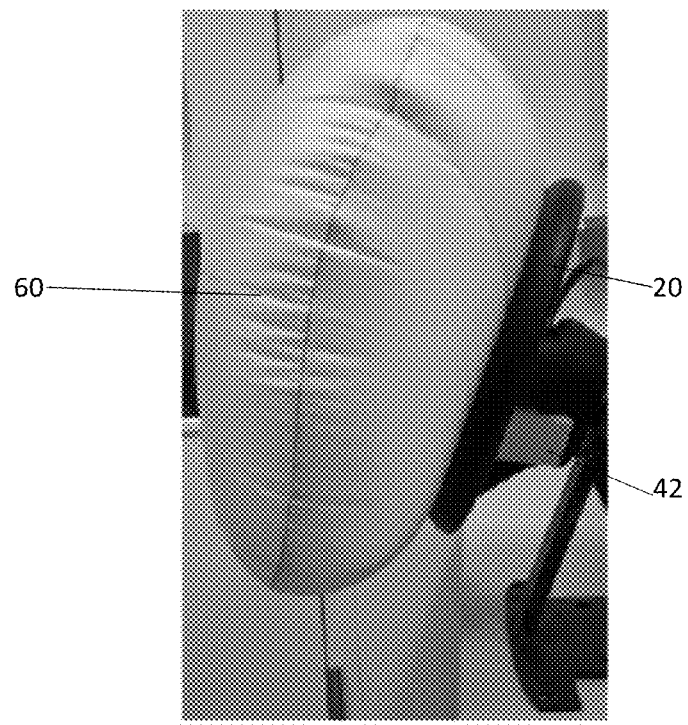
FIG. 3C is side perspective view of the steering wheel and airbag module with the airbag deployed.
Figure 3D:
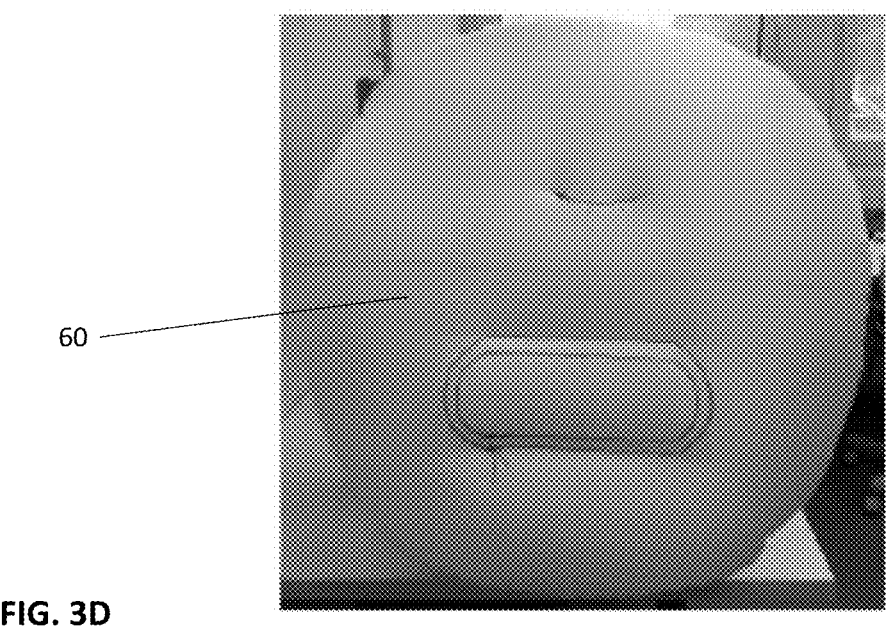
FIG. 3D is front view of the steering wheel and airbag module with the airbag deployed.

As shown in FIG. 2C, the housing 42 with the folded cushion 60 is attached offset from and below a center region of the steering wheel assembly 10.

For illustration purposes, FIGS. 3A, 3B, 3C and 3D show a mock up test fixture with an air hose 100 for providing air inflation to the airbag cushion 60 to simulate an inflated deployment. As shown, the inflated airbag is configured to project outward from the housing 42 and completely block and occupant from hitting the steering wheel assembly 10 in the event of a crash. The cushion 60, although stowed off center is designed to expand beyond the perimeter of the rim 20 as shown.

Figure 4A:
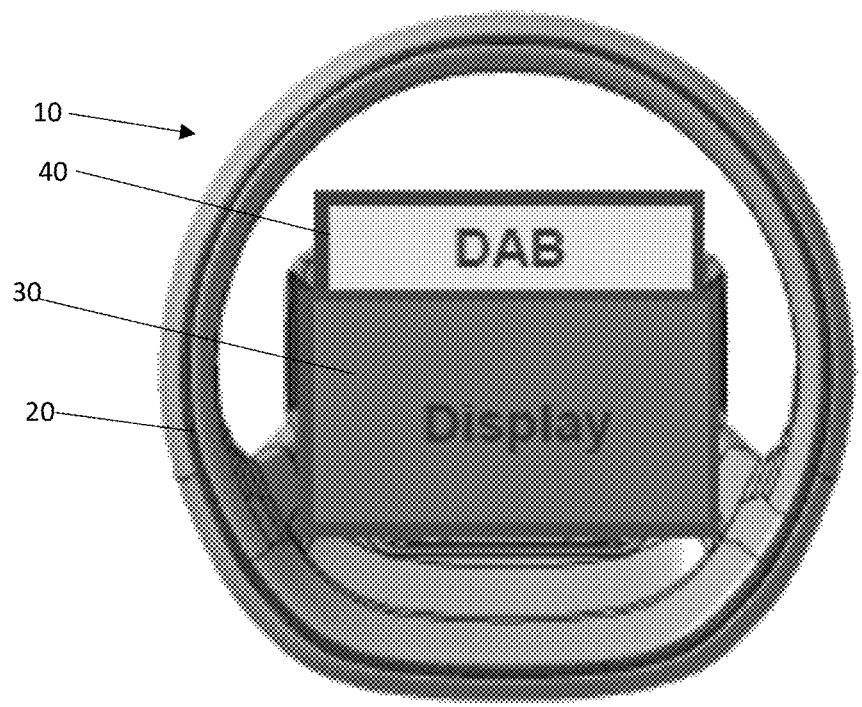
FIG. 4A is an alternative embodiment with the airbag module assembly located above the visual display.
Figure 4B:
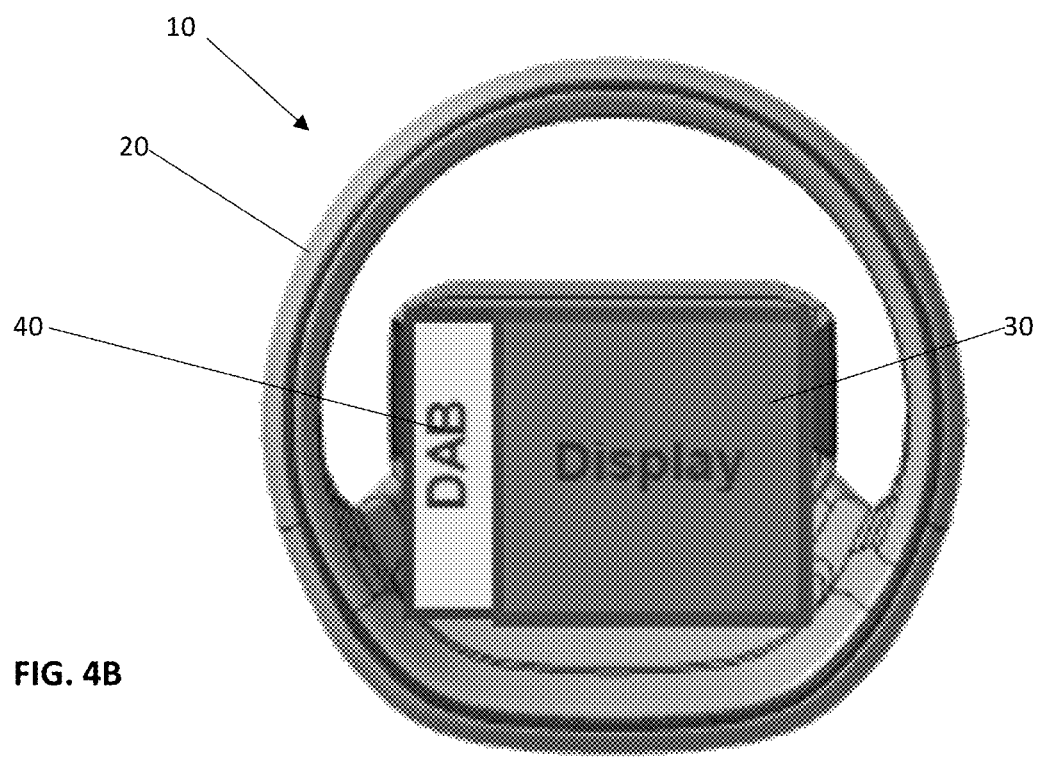
FIG. 4B is an alternative embodiment with the airbag module assembly located to the left of the visual display.
Figure 4C:
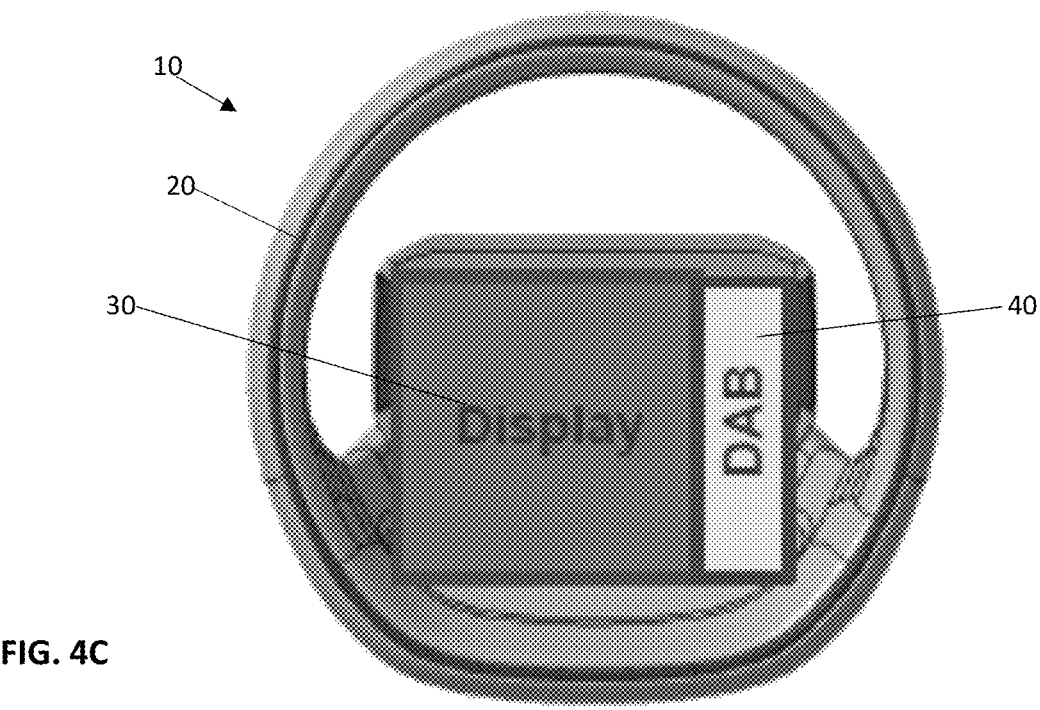
FIG. 4C is an alternative embodiment with the airbag module assembly located to the right of the visual display.
Figure 4D:
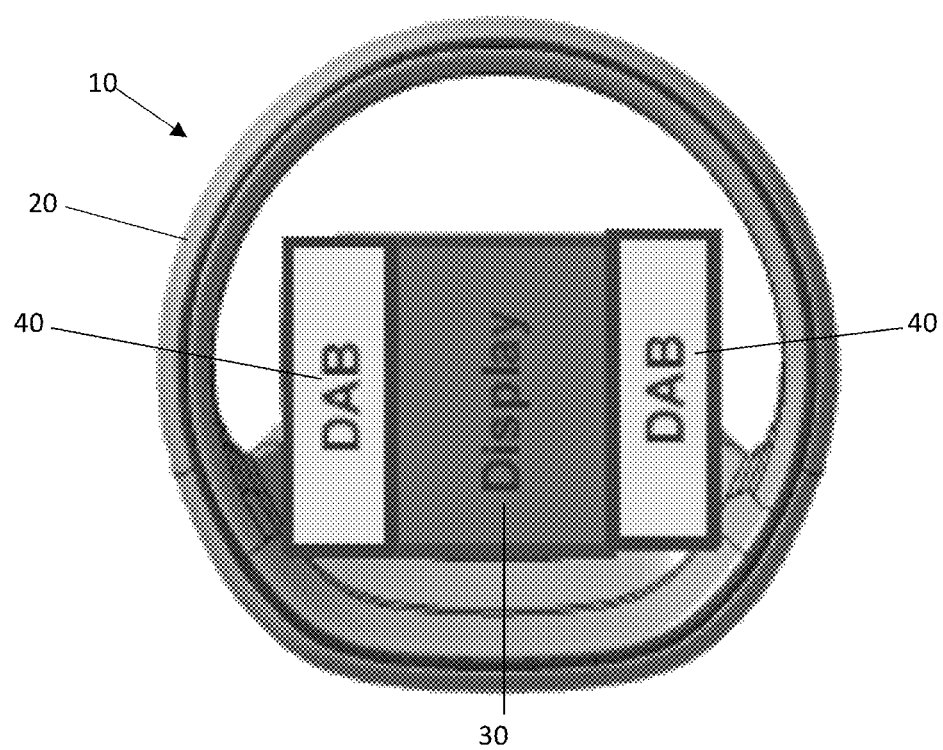
FIG. 4D is an alternative embodiment with the airbag module assembly located to the left and right of the visual display.

FIGS. 4A-4C show the airbag module assembly 40 can be mounted in various locations. In the first embodiment, the airbag module 40 has the housing 42 positioned below the center region, wherein the airbag module housing 42 is placed on the steering wheel at a 6 o'clock location when the steering wheel is oriented at a 12 o'clock top center position. Alternatively, the airbag module housing 42 can be positioned on the steering wheel at a 12 o'clock location when the steering wheel is oriented at a 12 o'clock top center position shown in FIG. 5 or the 9 o'clock location shown in FIG. 4B or the 3 o'clock location shown in FIG. 4C, also any combination of locations can be used if more than one airbag module assembly is used, as shown in FIG. 4D.

The airbag cover could be provided with a tear seam 55, as illustrated in FIG. 1A, and the visual display unit 28 is affixed to one half of the airbag cover 50. On deployment, the entire visual display unit 28 would remain attached to a portion of the airbag cover 50 as the airbag is deploying. In this fashion, the visual display unit 28 would never move with the portion of the airbag cover 50 that is broken along the frangible seam 55 staying attached to second portion 54 to which it is affixed. Alternatively, the first portion 52 and second portion 54 of the airbag cover 50 can be two separate pieces with the first portion 52 covering the frontal opening 41 and the second portion 54 being fixed to the center region.

Figure 5:
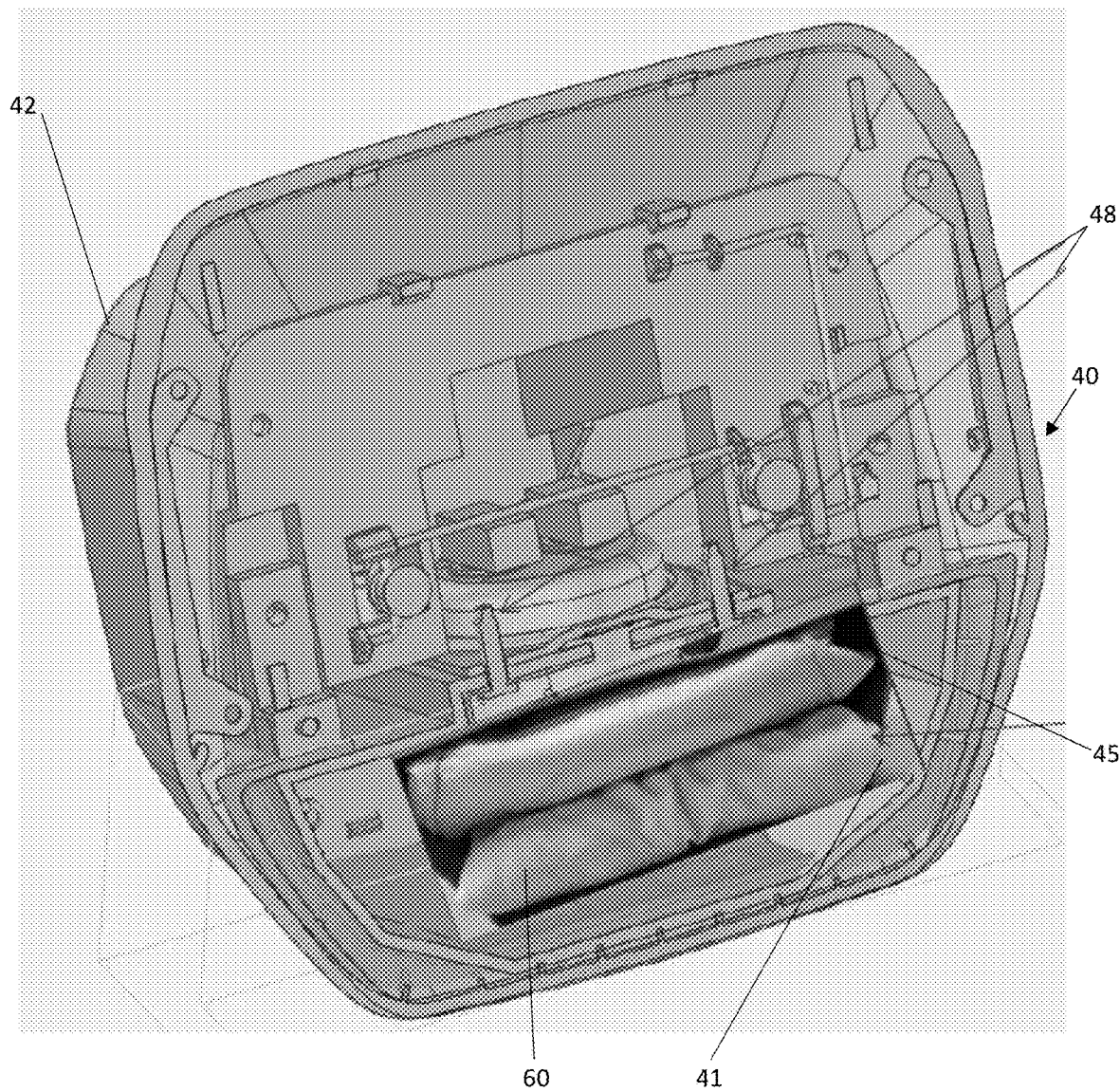
FIG. 5 is a frontal perspective view of a preferred embodiment airbag module of the present invention.

With reference to FIG. 5, a perspective view of the airbag module assembly 40 is illustrated with the folded airbag cushion 60 tucked neatly in the cavity 45 provided in the opening 41 in the lower portion of the housing 42, as illustrated. As shown, the posts 48 for the retaining ring are shown projecting upward in the housing 42. These posts 48 are part of the retaining ring which is used to affix the airbag 60 to the module housing 42.

Figure 6A:
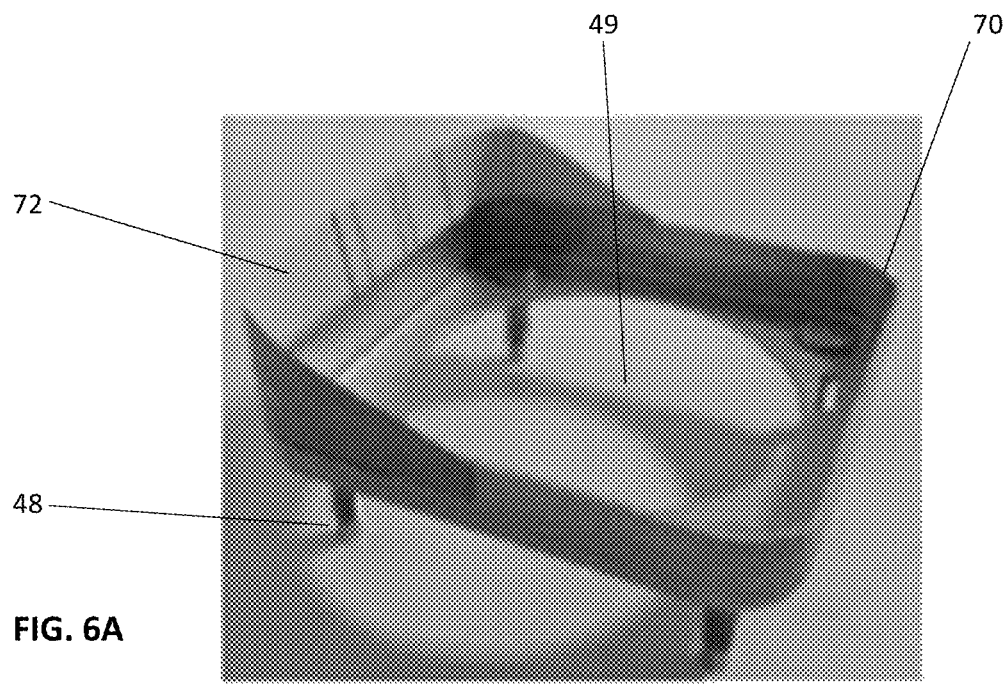
FIG. 6A is a left side perspective view of a first embodiment retainer design for the airbag module assembly of FIG. 5.
Figure 6B:
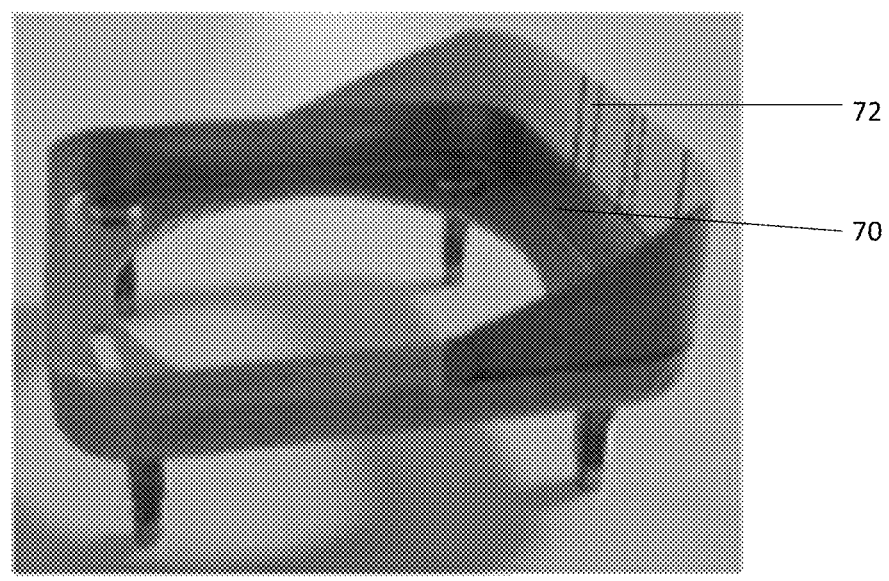
FIG. 6B is a right side perspective view of the retainer design taken from FIG. 6A.

As shown in FIGS. 6A and 6B, a first design of a retainer 70 is illustrated. The retainer 70 has an opening 49 through which inflation gases will fill the airbag. Projecting downwardly are the posts 48 that are used to secure the retainer 70 and the airbag 60 to the housing 42. The retainer design, as illustrated in FIGS. 6A and 6B, has a perimeter flange around the entire airbag with one side pronouncedly larger than the other side. This enlarged flange 72 is illustrated in both FIGS. 6A and 6B. FIG. 6A being a left side view and FIG. 6B being a right side view of the same retainer 70. This enlarged flange 72 is used to facilitate the assembly and the eventual opening of the airbag 60 as will be seen in later drawings.

Figure 6C:
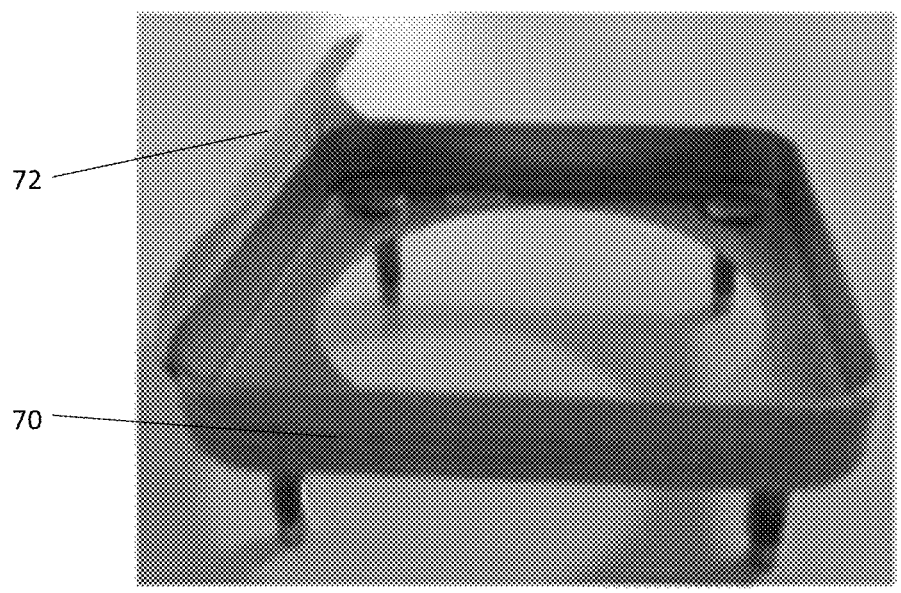
FIG. 6C is a left side second embodiment retainer design for the airbag module assembly of FIG. 5.

With reference to FIG. 6C, the enlarged flange 72 of a second retainer 70 design is illustrated showing the enlarged flange 72 being slightly curved or arcuate, otherwise the function of the designs are the same. The advantage of this enlarged flange 72 helps with regard to the airbag assembly when placed in the module housing 42.

Figure 7:
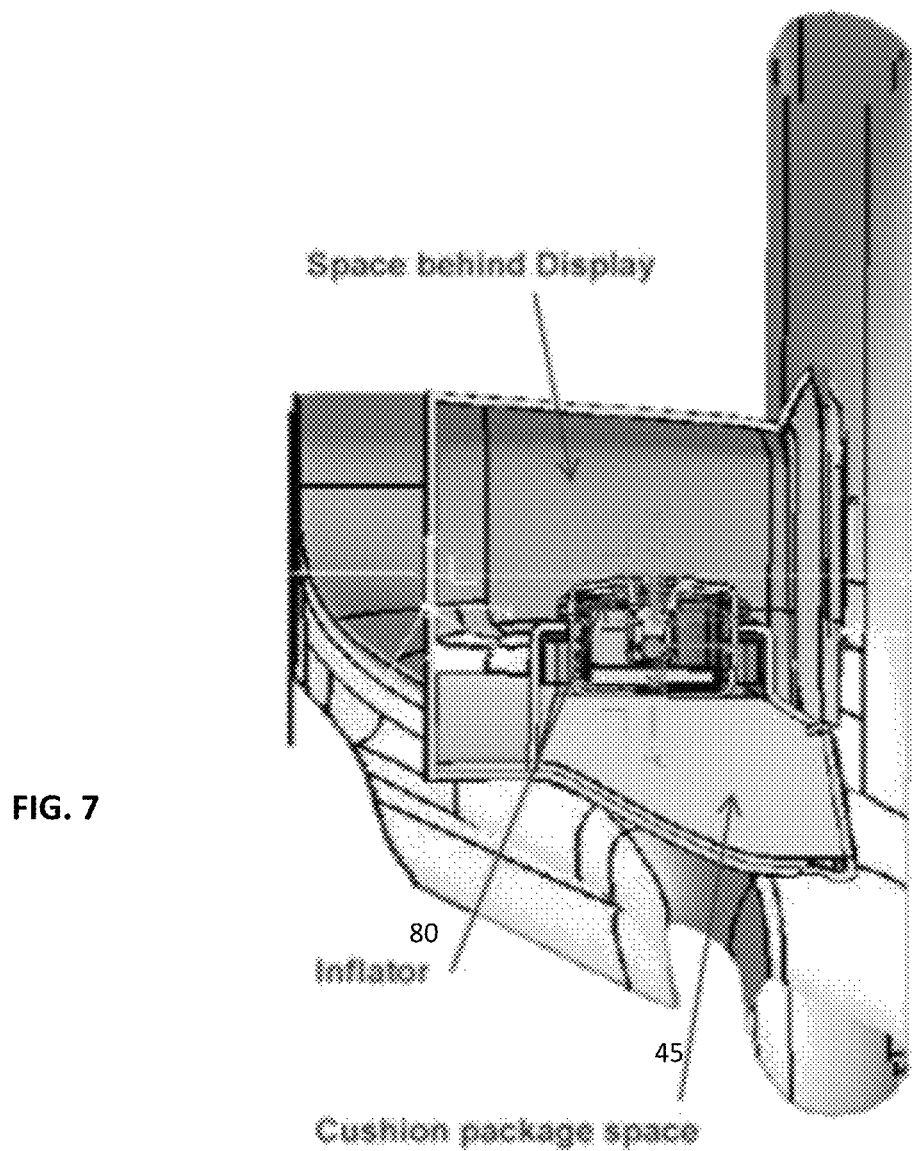
FIG. 7 is a cross section of the module assembly of FIG. 5 mounted to a steering wheel assembly.

With reference to FIG. 7, a cross sectional view is shown where the inflator is shown positioned above the folded airbag 60 cushion package which is placed in the cavity 45 of the housing 42. The module housing occupies the space behind a visual display unit on the steering wheel assembly as shown. This is very similar to the illustration shown in FIG. 1B.

With reference to the airbag cushion 60 itself, it is important to note for the airbag cushion 60 to function properly, it must be designed in a specific way for this type of mooring location in the airbag module housing 42. As such, there will be a front panel, a pair of side panels and end panels used to fabricate the entire airbag cushion 60. The airbag cushion 60 when fabricated will be designed that when properly folded it will deploy in a direction desirable for the location in which the airbag has been folded and placed in the airbag module housing 42.

Figure 9A:
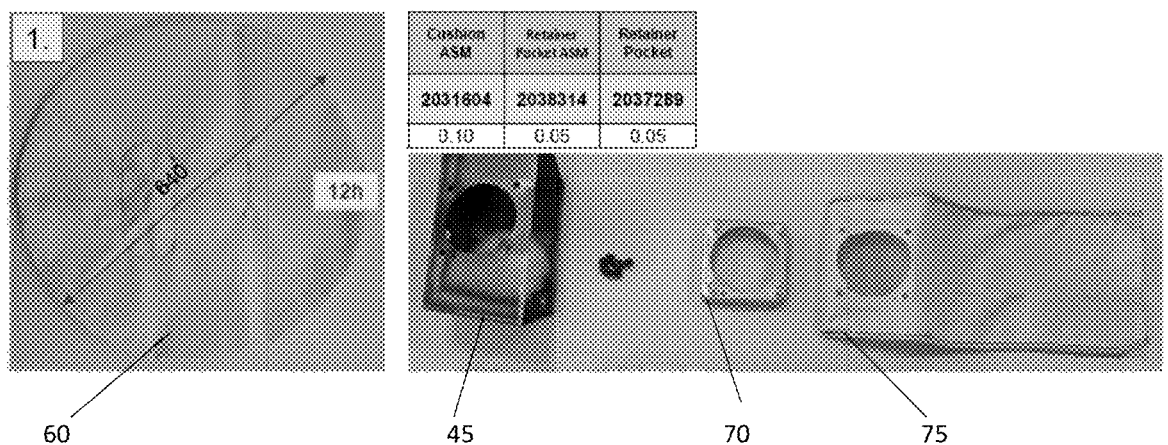
FIGS. 9A-9O are numerous sequential views showing the airbag cushion folding sequence used to facilitate packing the airbag cushion into the module housing cushion chamber.
Figure 9B:
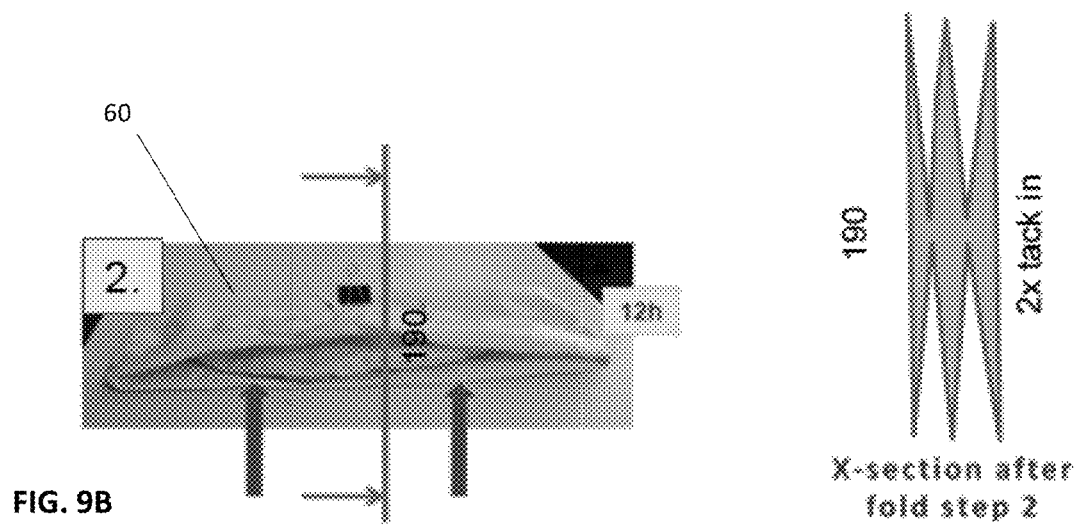
Figure 9C:
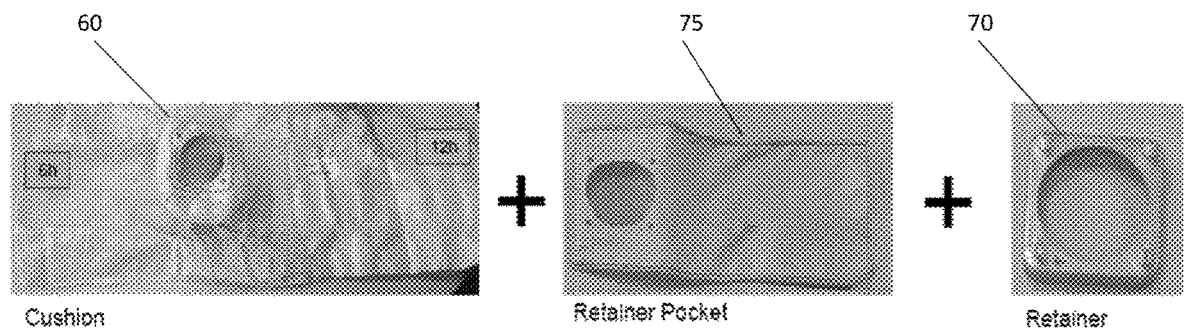
Figure 9D:
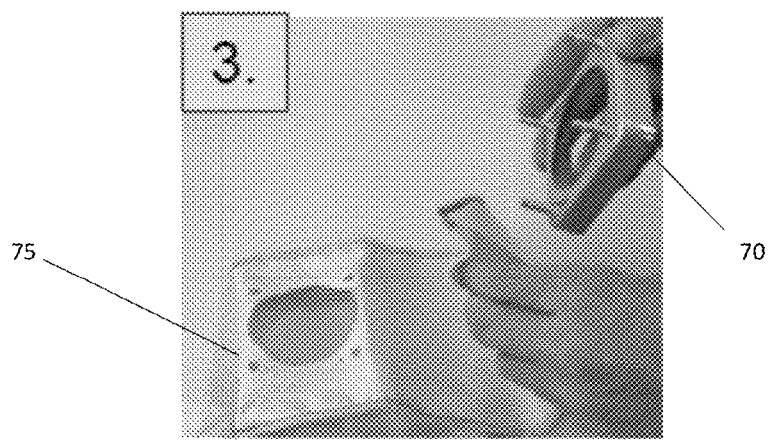
Figure 9E:
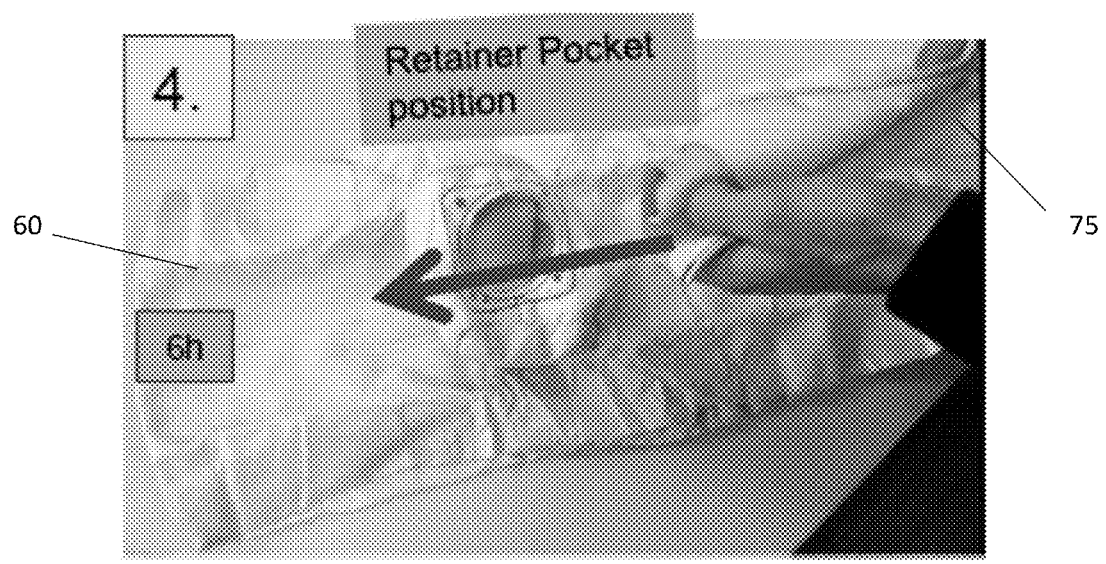
Figure 9F:
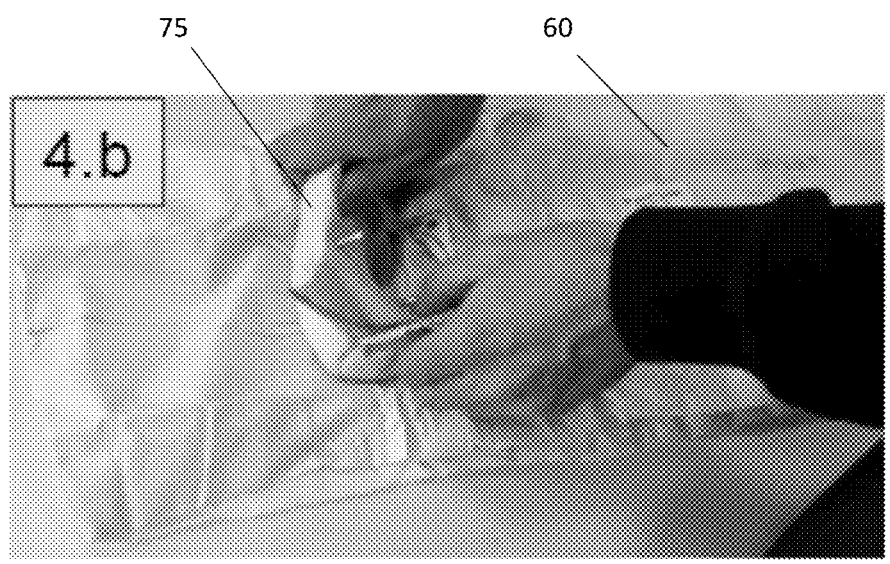
Figure 9G:
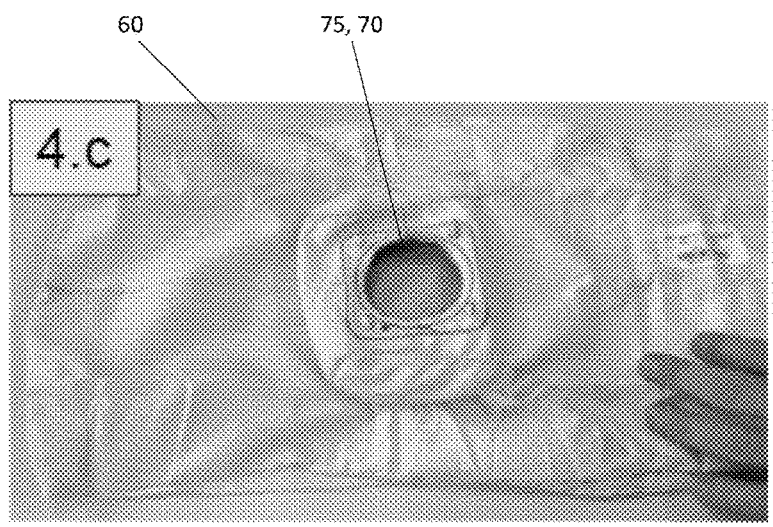
Figure 9H:
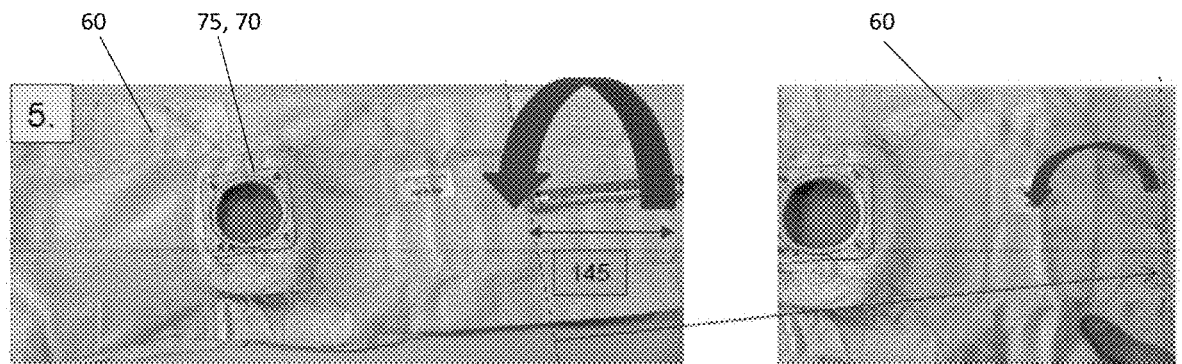
Figure 9I:
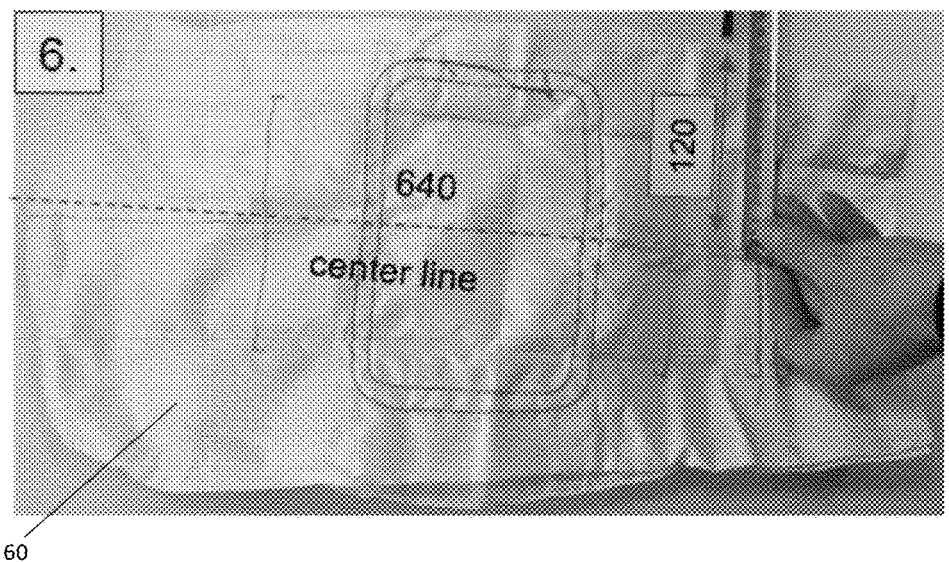
Figure 9J:
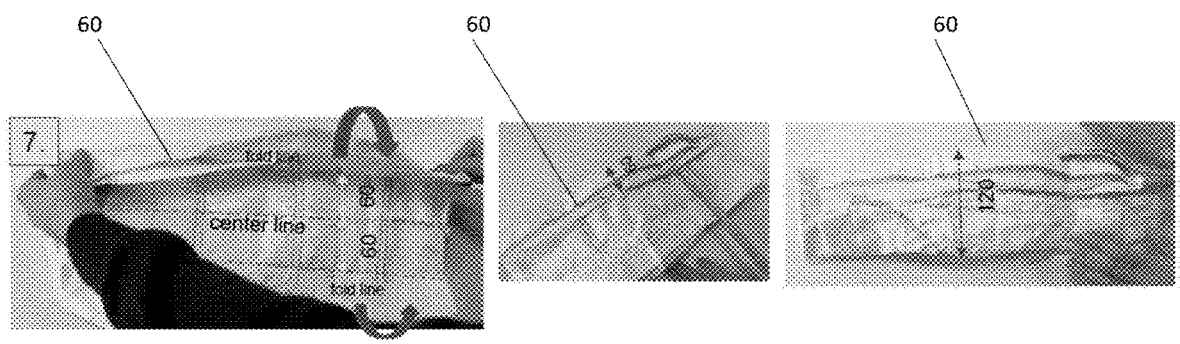
Figure 9K:
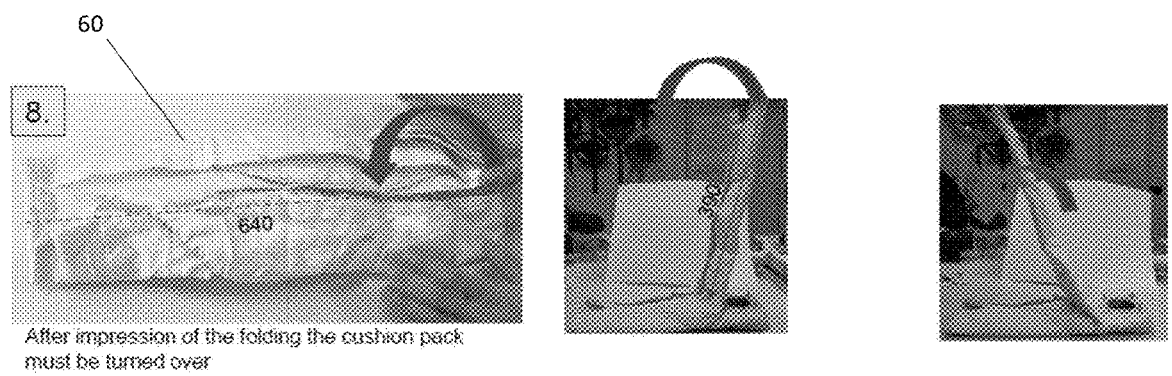
Figure 9L:
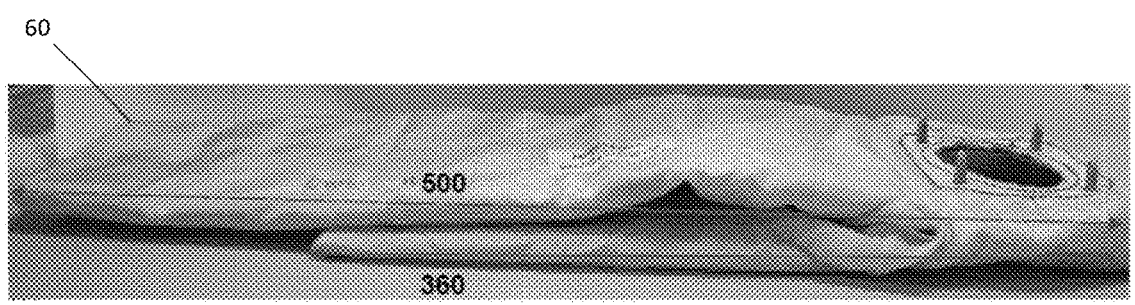
Figure 9M:
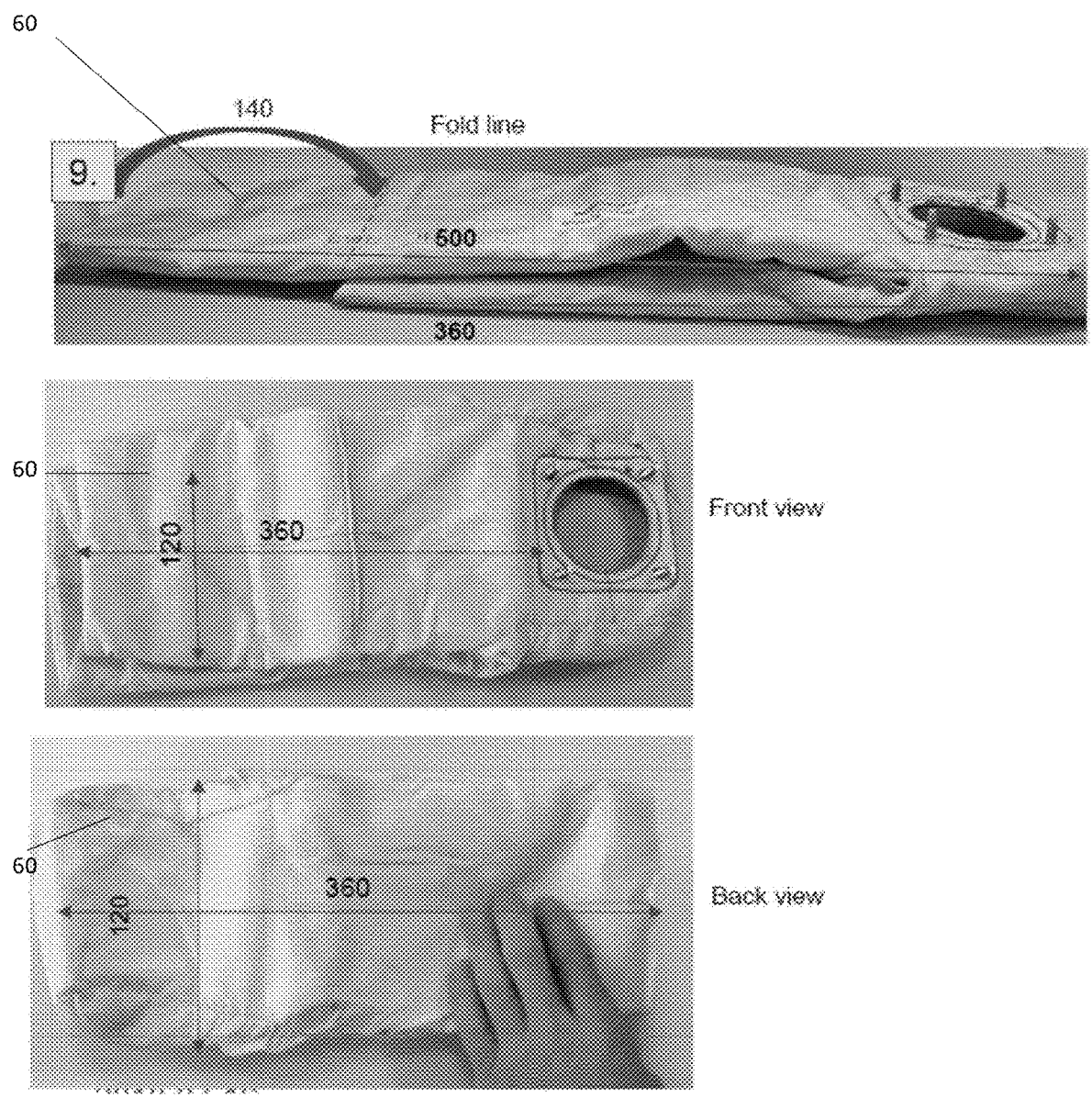
Figure 9N:
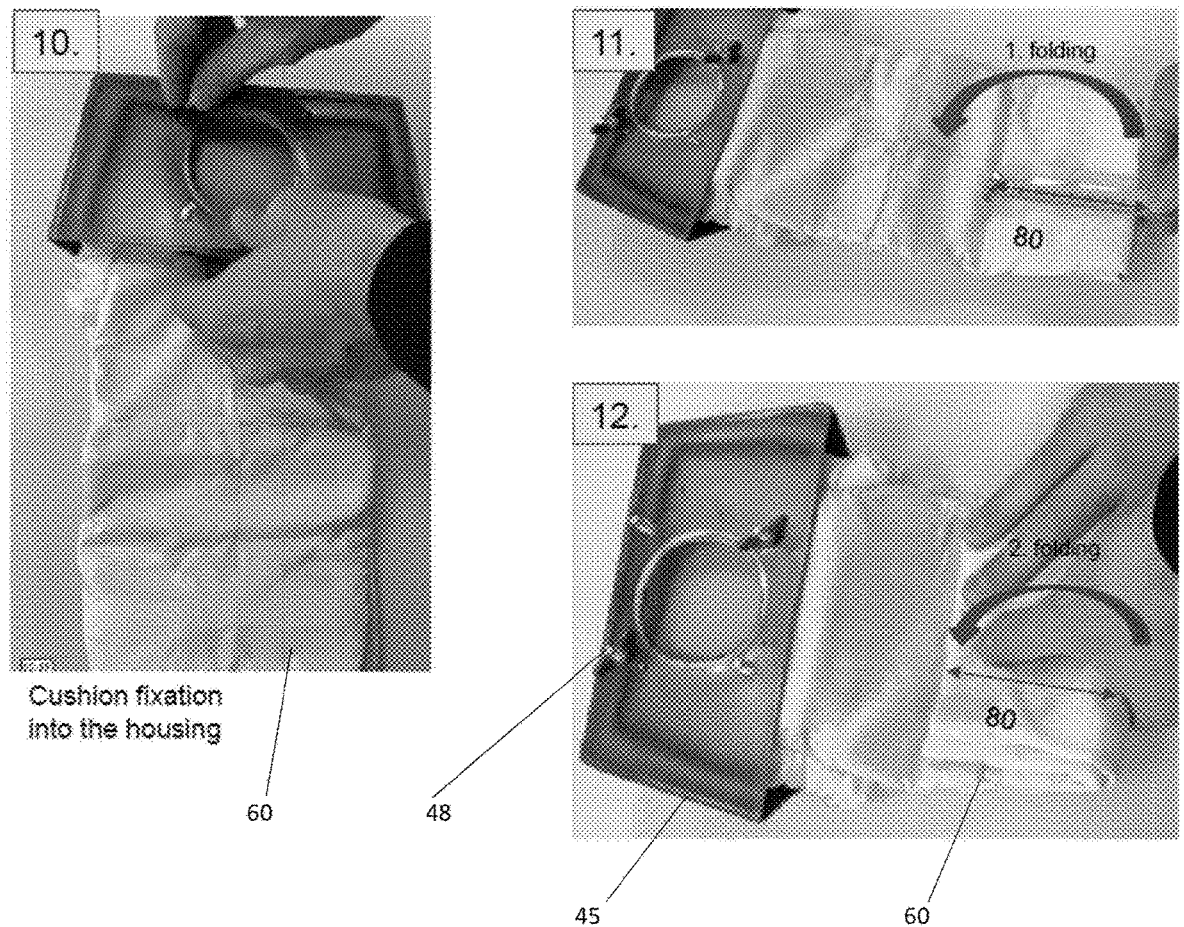
Figure 9O:
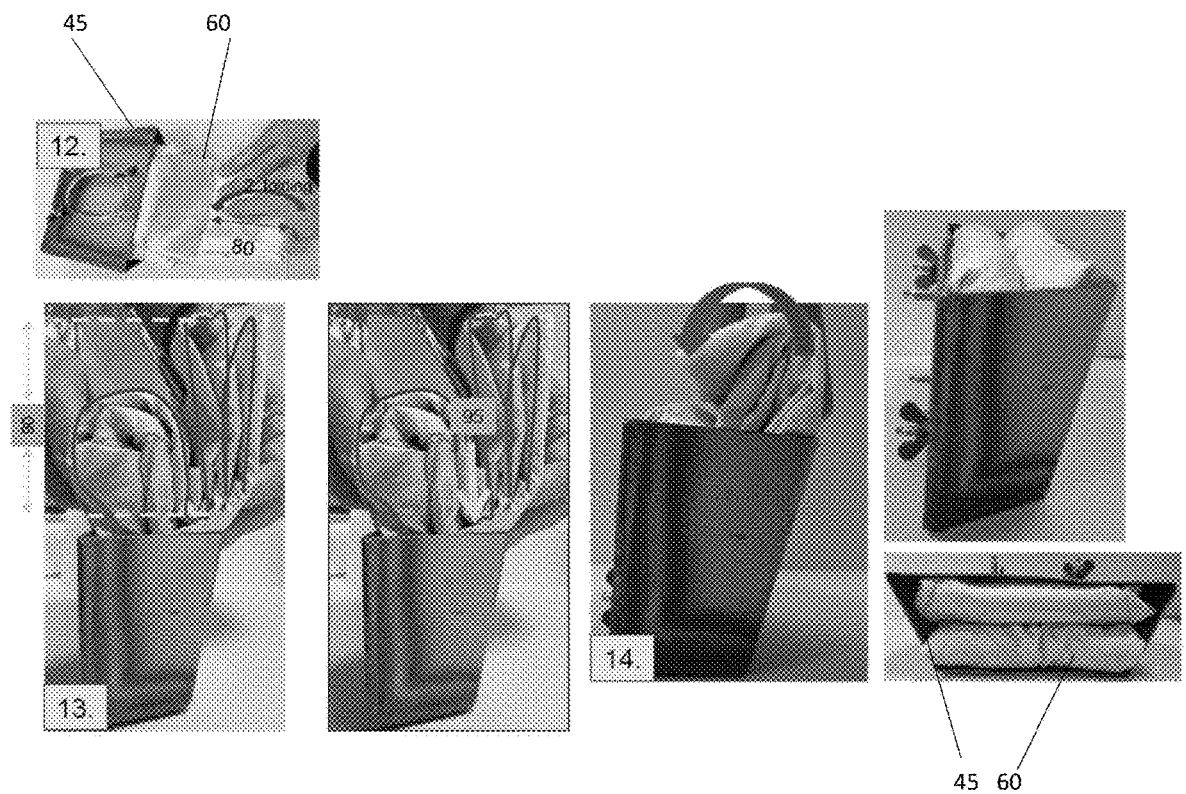

In order to appreciate the complexity and uniqueness of the airbag cushion folding technique, FIGS. 9A-9O are provided. These figures are step by step illustrations of how the airbag is positioned. FIG. 9A is a first step showing the airbag with the circular frontal panel shown in a flat position off the right are shown some of the various components including retainer and the airbag opening in a flat position. FIG. 9B shows the airbag cushion 60 folded slightly in an "X-section" after fold step 2. When this occurs, the pattern on the right side of FIG. 9B is achieved. The cushion 60, is laid flat as shown in FIG. 9C with the retainer pocket 75 provided and retainer 70. The coupling of the retainer 70 and retainer pocket 75 is shown in FIG. 9D as step 3 of the process of assembly. Once the retainer pocket 75 is positioned and the retainer 70 is placed as shown in FIGS. 9E and 9F respectively, the airbag 60 then looks as shown in FIG. 9G with the retainer pocket 75 and retainer 70 in place. At this point, as shown in FIG. 9H, the material is folded over at a fold line, the cushion length is reduced from 640 mm to 360 mm, as illustrated. The right hand view shows the exact fold line location in the folded position.

FIG. 9I illustrates the center line of the airbag 60. The center line is then folded over as illustrated in FIG. 9I as the two opposing sides are folded over. After impression of the folding of the cushion pack, the cushion pack must be turned over as shown in FIG. 9K. When the airbag 60 is folded over, it has the appearance of the two right hand figures in FIG. 9K. FIG. 9L shows the configuration where part of the airbag 60 is folded under and part over with the retaining posts 48 projecting outward from the retainer 70 at the opening of the airbag cushion 60. FIG. 9M shows several views identified as step 9 wherein a fold line is provided and the airbag cushion 60 is folded back towards the opening. At this point, there is a front view and a back view of the airbag 60 that is shown rather tightly as an elongated rectangular shape condensed in size substantially. At this point in FIG. 9N, the cushion fixation occurs into the chamber 45, as shown chamber 45 is illustrated to which the mounting posts 48 project through openings and this forms part of the airbag housing assembly 40 and lower cavity. This is best illustrated in FIG. 9O wherein the entire airbag 60 in the folded configuration is placed into the cavity 45 of the airbag module housing assembly 40. This is shown in the steps 12, 13 and 14 of FIG. 9O. When fully inserted, the airbag looks as shown in the lower right portion of FIG. 9O. Once this is achieved, the entire airbag 60 is positioned in cavity 45 and ready for deployment. What is important to understand, is the folding technique directly relates to how the airbag 60 will deploy when inflation gases first enter into the cushion starting to fill the cushion 60.

Figure 8:
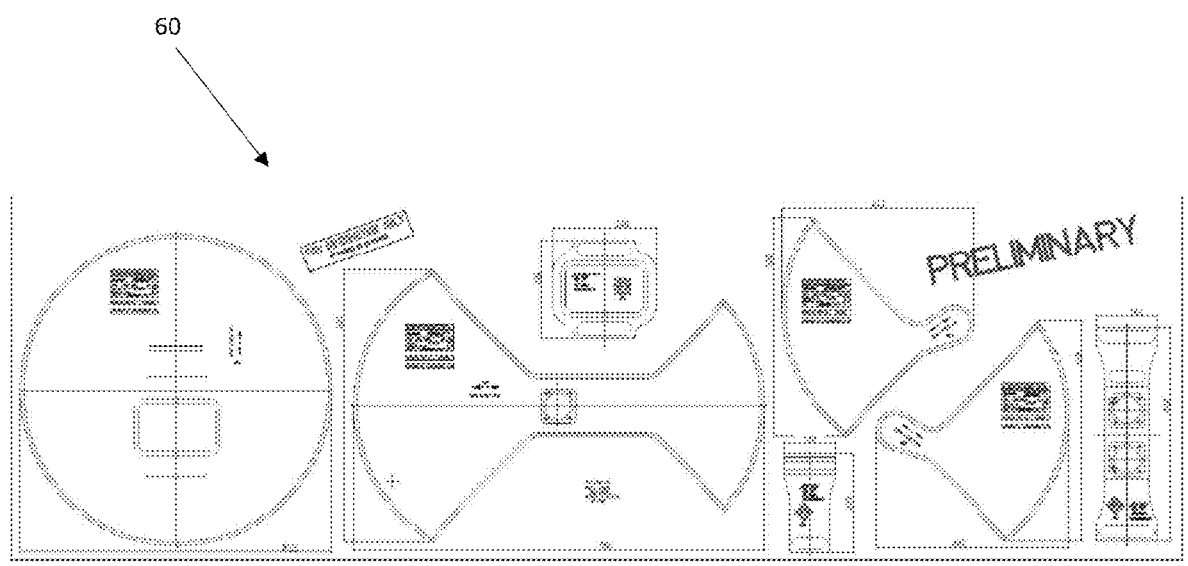
FIG. 8 shows views of the panels used to make the airbag cushion for the present invention.
Figure 10A:
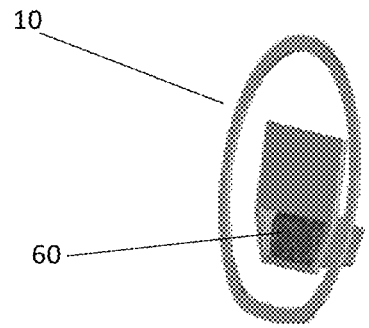
FIGS. 10A-10C show a static deployment sequence of the airbag cushion when inflated.
Figure 10A:
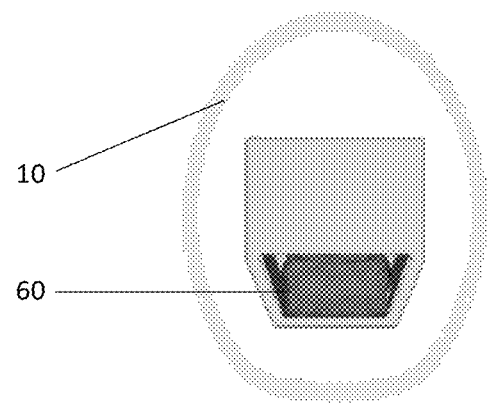
Figure 10B:
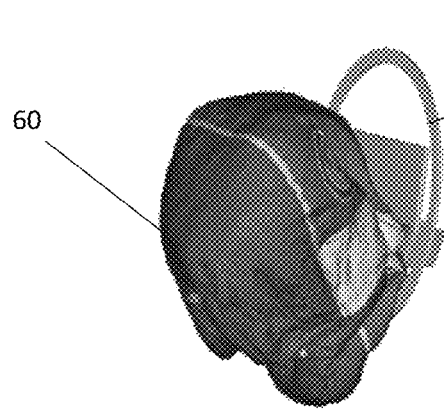
Figure 10B:
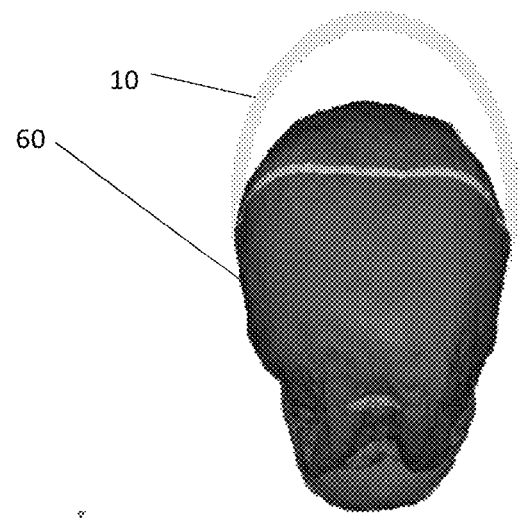
Figure 10C:
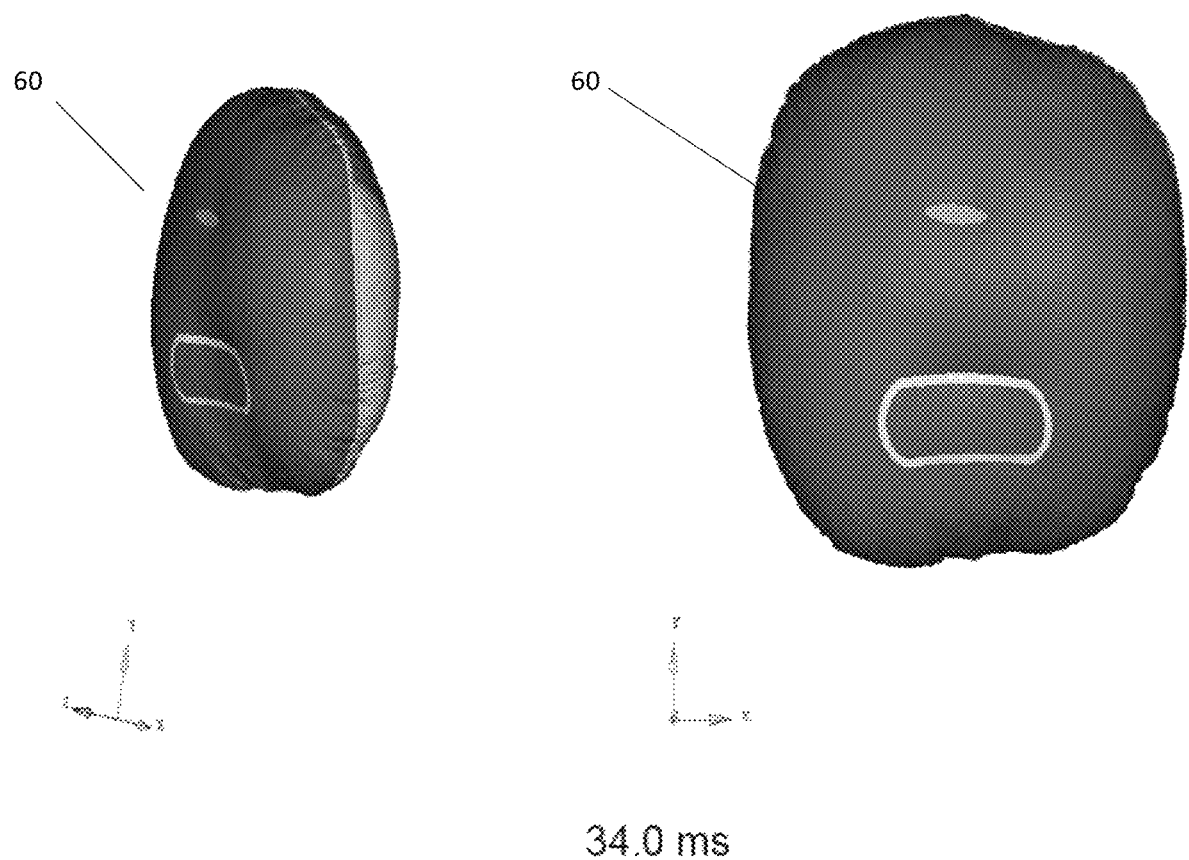

As shown in FIG. 10A, at 0.2 ms after deployment, the airbag is starting to exit the cavity 45 in the airbag module housing 40 and is directed substantially downwardly. At 14.6 ms shown in FIG. 10B, the airbag 60 is partially filled and as can be seen, is now filling in an upward position, partially blocking the steering wheel 18 and center hub 23 of the steering wheel assembly 10. The airbag 60 will continue to fill as illustrated in FIG. 10C at the 34.0 ms position to a fully inflated cushion 60 projecting upwardly and completely covering the steering wheel assembly 10 with the airbag cushion 60 being interposed between the driver and the steering wheel assembly 10. It is important to note that the airbag cushion 60 being specifically designed as illustrated in FIG. 8, allows for a folding technique that is unique requiring the steps shown in FIGS. 9A-9O. Once this airbag cushion 60 is fully packed into he airbag housing module 40 into the cavity 45, it then can reliably and consistently deploy when air inflation gases fill the airbag as illustrated in FIGS. 10A-10C.

Figure 11:
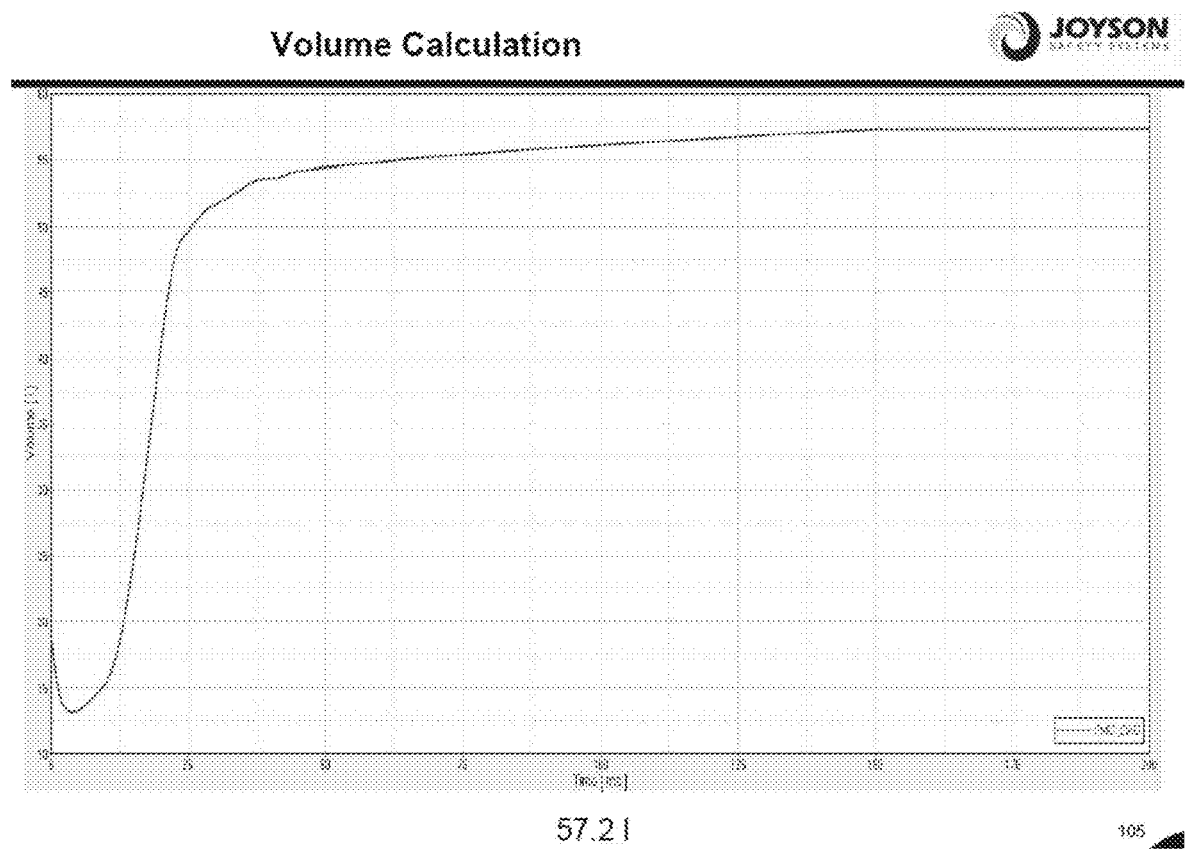
FIG. 11 is a graph showing the airbag deployment volume over time in milliseconds.

To appreciate what is happening on the initial filling of the airbag 60, a chart is shown in FIG. 11 indicating the volume of the airbag cushion 60 as it is being deployed over a time duration wherein the total time to complete and full inflation is 57.21 ms. This ability to deploy reliably and consistently by projecting form a lower portion of an airbag module housing and allowing the airbag to then project outwardly and fill upwardly is unique due to the airbag construction, folded and positioned in the airbag module housing 40.

As fully disclosed above, the airbag module assembly 40 by being removed from the center region of the steering wheel 10 provides a large region for the placement of a visual display system 28 to be placed conveniently for the driver. This feature allows for all instrumentation features currently placed in the dashboard to be eliminated if desired, making the steering wheel assembly a complete information and gauge platform if desired. The present invention with the display unit is particularly useful in GPS navigation and even provides a messaging platform with makes it more useful in autonomous vehicles of the future.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An airbag module assembly comprising:
   an airbag;
   an inflator;
   a housing containing a chamber, the chamber defining a cavity for stowing the airbag, the chamber having a first side and a second side adjacent the first side, wherein the first side defines a forward-facing opening in communication with the cavity for receiving the airbag and the second side defines an inflator opening in communication with the cavity for receiving the inflator;
   a cover for enclosing the housing and stowed airbag; and
   wherein the airbag is fixed to the chamber and is offset from a center region of the housing and the airbag is configured upon deployment to project outward through the forward-facing opening of the chamber toward an occupant.

2. The airbag module assembly of claim 1, further comprising a steering wheel, wherein the airbag is placed on the steering wheel between a center of the steering wheel and a 6 o'clock location of the steering wheel when the steering wheel is oriented at a 12 o'clock top center position.

3. The airbag module assembly of claim 1, further comprising a steering wheel, wherein the airbag is positioned on the steering wheel between a center of the steering wheel and a 12 o'clock location of the steering wheel when the steering wheel is oriented at a 12 o'clock top center position.

4. The airbag module assembly of claim 1, wherein the cover has a first portion configured to enclose the forward-facing opening of the chamber and a second portion to cover the center region of the housing.

5. The airbag module assembly of claim 4, wherein the cover has a frangible seam on the first portion that tears upon airbag deployment.

6. The airbag module assembly of claim 4, wherein the second portion has a flat region.

7. The airbag module assembly of claim 1, further comprising a visual display unit.

8. The airbag module assembly of claim 7, wherein the visual display unit is positioned in the center region of the housing.

9. The airbag module assembly of claim 8, wherein the visual display unit is attached to the cover.

10. The airbag module assembly of claim 9, wherein the cover has a frangible opening that tears on deployment and the visual display unit is stationary and affixed to a fixed portion of the cover removed from the frangible opening.

11. The airbag module assembly of claim 10, further comprising a steering wheel, wherein the frangible opening of the cover is defined along an upper portion or a lower portion of the cover relative to the visual display unit, wherein the upper portion of the cover is disposed between a center of the steering wheel and a 12 o'clock location of the steering wheel, and the lower portion of the cover is disposed between the center of the steering wheel and a 6 o'clock location of the steering wheel.

12. The airbag module assembly of claim 7, wherein the visual display unit has a touch screen for controlling the visual display unit.

13. The airbag module assembly of claim 7, wherein the visual display unit has a rigid display.

14. The airbag module assembly of claim 7, wherein the visual display unit has a flexible touch screen display directly affixed to the cover.

15. The airbag module assembly of claim 7, further comprising a steering wheel, the steering wheel including a rim, wherein the visual display unit is positioned relative to the rim above, at or below a plane defined by the perimeter of the rotatable rim.

16. The airbag module assembly of claim 7, further comprising a steering wheel, the steering wheel including a rim, wherein the rim is spaced a distance from the airbag and visual display unit to facilitate hand grip along 360 degrees of the perimeter of the rim.

17. The airbag module assembly of claim 7, wherein the visual display unit is part of an autonomous vehicle drive system.

18. The airbag module assembly of claim 7, wherein the visual display unit broadcasts incoming calls, text messages and video including satellite navigation systems.

19. The airbag module assembly of claim 1, wherein the airbag is configured to be attached to a non-rotatable center hub of a steering wheel having a rotatable rim.

* * * * *